United States Patent
Byrd

(10) Patent No.: US 10,788,347 B2
(45) Date of Patent: Sep. 29, 2020

(54) METHOD FOR ESTIMATING PHYSICAL CHARACTERISTICS OF TWO MATERIALS

(71) Applicant: Government of the United States, as represented by the Secretary of the Air Force, Wright-Patterson AFB, OH (US)

(72) Inventor: Larry W. Byrd, Huber Heights, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 465 days.

(21) Appl. No.: 15/653,622

(22) Filed: Jul. 19, 2017

(65) Prior Publication Data
US 2019/0025105 A1   Jan. 24, 2019

(51) Int. Cl.
*G01F 1/74*   (2006.01)
*G06T 11/00*   (2006.01)
(Continued)

(52) U.S. Cl.
CPC .................. *G01F 1/74* (2013.01); *G01F 1/64* (2013.01); *G01N 27/226* (2013.01);
(Continued)

(58) Field of Classification Search
CPC ........... G01F 1/74; G01F 1/64; G01N 27/226; G01N 27/228; G06T 11/003; G06T 11/008
(Continued)

(56) References Cited

U.S. PATENT DOCUMENTS

| 7,496,450 B2 | 2/2009 | Ortiz Aleman et al. |
| 8,552,752 B2 | 10/2013 | Qiu |

(Continued)

FOREIGN PATENT DOCUMENTS

| CN | 102713592 | 9/2014 |
| EP | 0123606 | 9/1987 |

(Continued)

OTHER PUBLICATIONS

Huang, Z., Wang, B., and Li, H., "Application of Electrical Capacitance Tomography to the Void Fraction Measurement of Two-Phase Flow", IEEE Transactions on Instrumentation and Measurement, vol. 52, No. 1, Feb. 2003. (6 pages).

(Continued)

*Primary Examiner* — Michael P Nghiem
*Assistant Examiner* — Dacthang P Ngo
(74) *Attorney, Agent, or Firm* — AFMCLO/JAZ; Charles Figer, Jr.

(57) ABSTRACT

An estimate of interfacial areas between the liquid and gas, liquid and wall, and gas and wall in two phase flow is determined using a standard 2D sensor in a fashion to infer 3D information about the liquid/vapor profile when the sensor length is much longer than the diameter. Cross-sectional flow areas for the gas and liquid are also estimated as a function of the axial dimension of the sensor, and the centroid of the mass in the sensor element can also be estimated. An electric capacitance tomography (ECT) system creates tomograms of the flow inside a sensor, and estimates of 3D physical area information are produced from the tomograms.

17 Claims, 16 Drawing Sheets

(51) Int. Cl.
*G01F 1/64* (2006.01)
*G01N 27/22* (2006.01)

(52) U.S. Cl.
CPC .......... *G01N 27/228* (2013.01); *G06T 11/003* (2013.01); *G06T 11/008* (2013.01)

(58) Field of Classification Search
USPC .......................................................... 702/155
See application file for complete search history.

(56) References Cited

U.S. PATENT DOCUMENTS

| | | | |
|---|---|---|---|
| 2009/0147616 A1* | 6/2009 | Leinonen | B01F 5/0471 366/142 |
| 2015/0346129 A1 | 12/2015 | Kersey | |
| 2015/0355126 A1 | 12/2015 | Voutilainen et al. | |
| 2016/0025663 A1 | 1/2016 | Lehikoinen et al. | |
| 2016/0076926 A1 | 3/2016 | McCann et al. | |
| 2016/0310040 A1* | 10/2016 | Marashdeh | A61B 5/0536 |
| 2018/0348158 A1* | 12/2018 | Marashdeh | G01N 27/228 |
| 2019/0310120 A1* | 10/2019 | McCann | G01F 1/58 |

FOREIGN PATENT DOCUMENTS

| | | |
|---|---|---|
| WO | 1991006833 | 5/1991 |
| WO | 2006102388 | 9/2006 |
| WO | 2015118332 | 8/2015 |
| WO | 2016038391 | 3/2016 |

OTHER PUBLICATIONS

Lionheart, W., "Reconstruction Algorithms for Permittivity and Conductivity Imaging" Manchester Institute for Mathematical Sciences, Eprint 2008.43, http://www.manchester.ac.uk.mims/eprints , ISSN 1749-9097.

Loser, T., Wajman, R. and Mewes, D., "Electrical Capacitance Tomnography: Image Reconstruction Along Electrical Field Lines", Measurement Science and Technology, 12 (2001) p. 1083-1091,Institute of Physics Publishing.

Sun, T. D., Mudde, R., Schouten, J.C., Scarlett, B., van den Bleek, C.M., "Image Reconstruction of an Electrical Capacitance Tomography System Using an Artificial Neural Network", 1st World Congress on Industrial Process Tomography, Buxton, Greater Manchester, Apr. 14-17, 1999.

Wanga, H., Hua, H-I., Wangb, L-j, Wang, H-x,"Image reconstruction for an Electrical Capacitance Tomography (ECT) system based on a least squares support vector machine and bacterial colony chemotaxis algorithm", Flow Measurement and Instrumentation 27 (2012) 59-66.

Warsito, Wand Fan, L.-S., "Measurement of real-time flow structures in gas—liquid and gas—liquid—solid flow systems using electrical capacitance tomography (ECT)", Chemical Engineering Science 56 (2001) 6455-6462.

Warsito, Wand Fan, L-S., "Neural network based multi-criterion optimization image reconstruction technique for imaging two- and three-phase flow systems using electrical capacitance tomography", Meas. Sci. Technol. 12 (2001) 2198-2210.

Xie, C.G., Huang, S.M>, Hoyle, B.S., Thorn, R., Lenn, C., Snowden, D., Beck, M.S., Electrical Capacitance Tomography for Flow Imaging: System Model for Development of Image Reconstruction Algorithms and Design of Primary Sensors, IEE Proceedings-G, vol. 139, No. 1, Feb. 1992.

Yang, W. and Peng, L., "Image reconstruction algorithms for electrical capacitance tomography", Meas. Sci. Technol. 14 (2003) R1-R13.

Banasiak, R., Wajman, R., Sankowski, D. and Soleimani, M., Three-dimensional nonlinear inversion of electrical capacitance tomography data using a complete sensor model. (2010) Progress in Electromagnetics Research (PIER), 100. pp. 219-234. ISSN 1070-4698.

Du, B., Marashdeh, Q., Warsito, W., Park, A.-H. A., Fan, L. S., "Development of Electrical Capacitance Volume Tomography (ECVT) and Electrostatic Tomography (EST) for 3D Density Imaging of Fluidized Bed System", 2007 ECI Conference on The 12th International Conference on Fluidization—New Horizons in Fluidization Engineering (10 pages).

Marashdeh, Q., Wang, F., Fan, L.S., Warsito, W.,"Velocity Measurement of Multi-Phase flows Based on Electrical Capacitance Volume Tomography", Proc. IEEE Sensors 2007 conference, p. 1017-1019.

Polydorides, N. and Lionheart, W., "A Matlab toolkit for three-dimensional electrical impedance tomography: a contribution to the Electrical Impedance and Diffuse Optical Reconstruction Software project", Meas. Sci. Technol. 13 (2002) (1871-1883).

Soleimani, M., Mitchell, C. N., Banasiak , Wajman, R., Adler, A., "Four-Dimensional Electrical Capacitance Tomography Imaging Using Experimental Data", Progress in Electromagnetics Research, PIER 90, 171{186, 2009) Warsito, W., Marashdeh, Q., and Fan, L.-S., "Electrical Capacitance Volume Tomography", IEEE Sensors Journal, vol. 1, No. 4, Apr. 2007, p. 525-535.

Weber, J., Mei, J., "Bubbling fluidized bed characterization using Electrical Capacitance Volume Tomography (ECVT)", in press, Powder Technology, www.elsevier.com/locate/powtec 2013 (1-11).

Warsito, W., Marashdeh, Q., and Fan, L.-S., "Electrical Capacitance Volume Tomography", IEEE Sensors Journal, vol. 7, No. 4, Apr. 2007, p. 525-535.

Kreitzer, P., Hanchak, M. and Byrd, L., "Horizontal Two Phase Flow Regime Identification: Comparison of Pressure Signature, ECT and High Speed Visualization", presented at 2012 ASME IMECE, Houston, TX.

\* cited by examiner

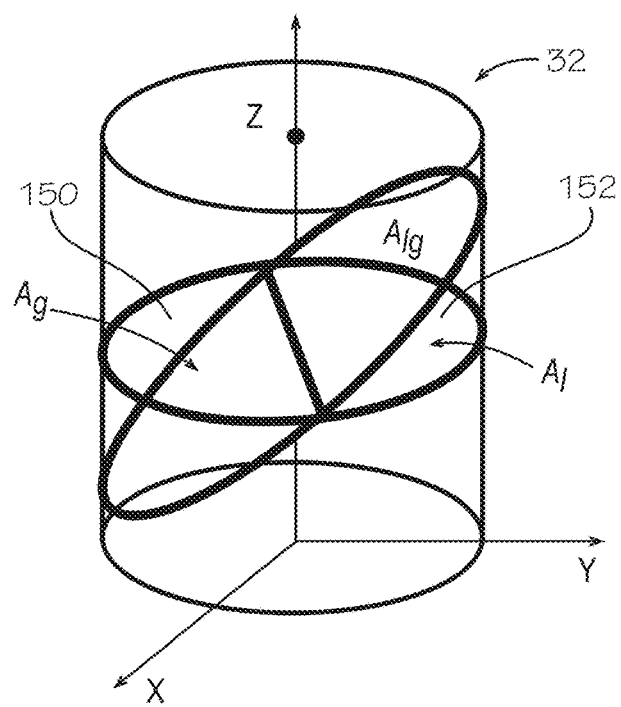 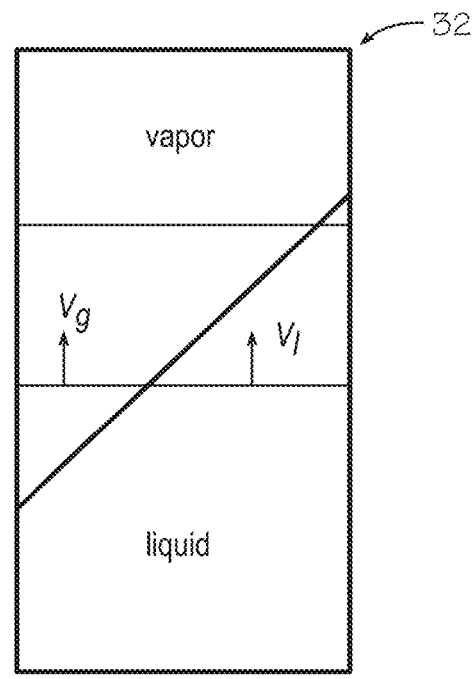
FIG. 16a  FIG. 16b
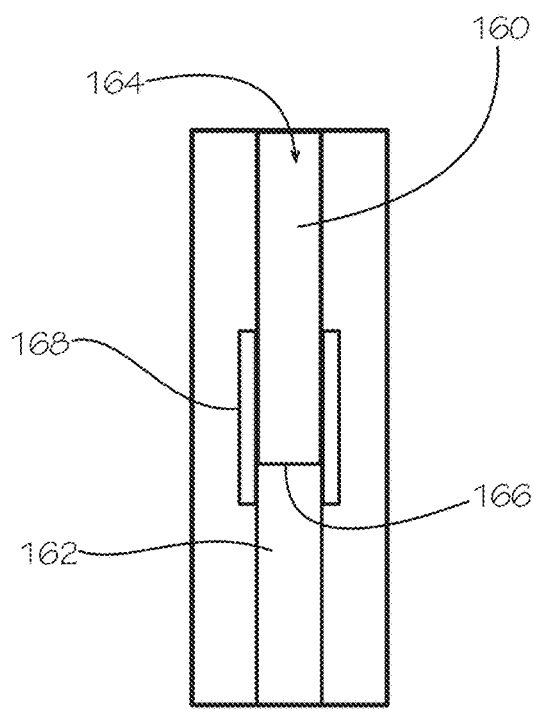
FIG. 17

METHOD FOR ESTIMATING PHYSICAL CHARACTERISTICS OF TWO MATERIALS

RIGHTS OF THE GOVERNMENT

The invention described herein may be manufactured and used by or for the Government of the United States for all governmental purposes without the payment of any royalty.

FIELD OF INVENTION

The present invention relates to the field of monitoring material within a sensor and altering the conditions of the material based on the monitoring and particularly relates to estimating characteristics of two materials flowing within a tube based on a tomogram of the materials produced by electrical capacitance tomography and altering the flow of the materials based on the estimated characteristic.

BACKGROUND OF THE INVENTION

Flowing mixtures, such as flowing mixtures of phases of a material are monitored by a variety of techniques including electrical capacitance tomography, which produces a two-dimensional tomogram representing the permittivity of the material being sensed. This data is interpreted in different ways. For example, it may be used to calculate the liquid fraction in the material.

However, other characteristics of the material may be more important or have a different useful significance than a simple liquid fraction. For example, in a flow of multi-phase material, such as a flow of liquid and gas, the surface areas of various interfaces provide important information. In a liquid/gas flow, the surface area of the interface between the liquid and the gas, the surface area between the liquid and the wall of a tube, and the surface area between the gas and the wall of the tube can be important. For example, in a heat exchange application, the surface area between the gas and wall would be inversely proportional to the heat flow into or out of the tube, and thus such surface area would be an important parameter to monitor in order to understand the heat transfer performance and may be used to modify or alter the flow to improve heat transfer performance. The surface area between a gas and liquid phase in a tube would also be an indicator of a pressure drop in the flow within the tube and the rate of change in such surface area would be a predictor of future waves within the flow. Thus, the gas/liquid surface area of a flow could be monitored, and alarms or trigger values could be set so as to change the flow to correct unwanted pressure drop and to avoid unwanted waves in the flow. However, in many circumstances, it is extremely difficult or impossible to monitor the aforementioned characteristic of flowing materials. What is needed in the art, therefore, is a process or method that solves or avoids the difficulty of directly monitoring the aforementioned characteristics of flow.

BRIEF SUMMARY OF THE INVENTION

Embodiments of the invention address the need in the art by providing a method which may assist in solving or avoiding the difficulties of directly monitoring the aforementioned characteristics of flow and instead may provide an accurate estimate of those characteristics by monitoring or calculating hypothetical physical characteristics of the materials. These hypothetical characteristics do not truly exist, but may be used to estimate physical characteristics that do exists. Also, the hypothetical physical characteristics may be used to control the materials to improve performance or avoid catastrophic failures. In summary, the hypothetical surfaces areas estimated by the technique described herein are a useful measure of current conditions and a predictor of future conditions in a flow of materials and thus the techniques constitute a valuable tool for monitoring flow. The present invention provides a way to estimate such surface areas quickly and reliably; and other parameters (such as heat transfer characteristics and pressure drops) may be estimated from the hypothetical characteristics.

In accordance with one aspect of the invention, tomography data corresponding to multiple materials (including multiple phases of the same material) is analyzed by a new method to derive information about the materials in a sensor volume in a different way. In one embodiment, a mixture of a first material and a second material is disposed in a three-dimensional sensor volume which is defined by a circumferential sensor wall and the length dimensions of a sensed volume of a sensor volume. A matrix of parallel voxels is defined within the sensor volume with each voxel having x, y and z dimensions. At least one parameter of the material is measured within the sensor volume, and a tomogram is produced. The tomogram is a two-dimensional matrix defined within a perimeter, and the matrix contains multiple values with one value being associated with each voxel. Each value represents the amount of the first material in the associated voxel. Multiple hypothetical points within the sensor volume are calculated based on the multiple values of the tomogram. The z coordinate of each point is calculated from at least one value of the tomogram, and the x and y coordinates of each point are based on the x and y coordinates of at least one associated voxel. The points are then used to calculate at least one hypothetical physical characteristic of the material within the sensor volume. For example, a hypothetical physical characteristic could be an hypothetical surface representing the interface between the first and second materials, or it could be an hypothetical surface representing the interface between the first material and the sensor wall. To be clear, the first material may be a first phase of a material (e.g., a liquid) and the second material may be a second phase of the same material (e.g., a gas).

These hypothetical surfaces do not exist but the areas of these surfaces are accurate estimates of surface areas that do exist. For example, the surface area of the hypothetical surface between the first and second materials is a good estimate of the surfaces areas of the interface surfaces that do exists between the first and second materials. Likewise, the area of the hypothetical surface of the wall exposed to the first material is a good estimate of the surface area of the wall that is actually exposed to the first material in the sensor.

In one embodiment the hypothetical characteristics may be used to control the flow of materials in a tube. For example, the hypothetical characteristic may be constantly repetitively calculated and compared to a predefined limit. If the limit is exceeded corrective action may be taken. For example, if the area of the hypothetical surface of the wall that is exposed to the first material exceeds a limit, a control signal may be generated and transmitted to a valve causing it to open and provide an increased flow of the second material in the lowing materials thereby driving down the relative amount of the first material in the sensor, which would decrease the area of the wall that is exposed to the first material.

In one alternative, the multiple points are used to calculate the surface area of the interface between the first and second materials. In such case, the points are assumed to be points on a hypothetical interface between the first and second materials. A surface is mapped through the points, and the area of the surface is calculated. That calculated area is the estimated surface area of the interface between the first and second materials. A smooth curved surface, or multiple smooth curved surfaces, may be mapped through the points when utilizing this technique, and the curved surface or surfaces will provide accurate results when calculating the hypothetical surface area of the mapped surface. However, a faster calculation may be achieved by mapping a multi-faceted surface through the points. In this technique, a triangular planar surface is mapped between combinations of three adjacent points to produce multiple triangular surface areas. None of the triangular surface areas overlap another surface area. The area of each triangular surface area is calculated, and the sum of those surface areas constitutes the surface area of the multifaceted planar surface that was mapped through the points. The overall surface area thus calculated is the estimated surface area of the interface between the first and second materials. Even though area is usually two dimensional in nature, it may be regarded as a form of a three-dimensional data in this case since it is a measure of the area of a three-dimensional shape, namely the hypothetical mapped surface.

In a variation of the above method, the sensor volume that is on each side of the mapped surface may be calculated. The volume on one side of the mapped surface is the estimated volume of the first material, and the volume on the other side of the mapped surface is the estimated volume of the second material. Either technique described above, or a different technique, may be employed to define the mapped surface and thereby define the two volumes. Once the two volumes are determined, other characteristics of the volumes may be calculated such as the mass centroid of each volume. Using the mass density of the two materials, the centroids of each material and the overall centroid of the material within the sensor volume may also be calculated. Finally, in a similar manner the cross-sectional area of each material may be determined where the cross-section is taken in a direction perpendicular to the linear direction of the sensor, which is also perpendicular to the flow of material within the sensor.

In another alternative, the multiple points may be used to calculate the surface area of the sensor wall that is contacted by either the first or the second material. In this technique, the points may be calculated as discussed above, and only the outermost points are used to calculate the surface area of the sensor wall that is in contact with one of the materials. The outermost points will form a closed loop disposed adjacent to the wall of the sensor. The surface area of the wall on one side of the closed loop is the surface area of the first material, and the surface area of the wall on the other side of the closed loop is the surface area of the second material. In this alternative, the outermost points may be calculated in different ways. For example, the outermost points could be determined by simply using the outermost values of the tomogram to identify the z dimension of the outermost points, and the x and y coordinates of the points may be determined by reference to one or more voxels. Alternatively, the outermost points could be determined by identifying four adjacent tomogram values arranged in a square pattern, and calculating a single point based on the four adjacent tomogram values. The z dimension of the point would be based upon the values of the four adjacent tomogram values. The x and y dimensions of the point would be based upon the x and y positions of the four adjacent tomogram values or their associated voxels.

While the techniques of the present invention may be used in a variety of settings, a particularly useful application is for analyzing an electrical capacitance tomogram corresponding to a flowing mixture of multiple phase materials, such as a liquid and gas. In such case, a plurality of capacitive sensors are disposed in a side-by-side relationship around and adjacent to the circumferential sensor wall. Typically, the sensor wall is cylindrical. Each sensor has a width and a length, and the length of each sensor is disposed parallel to the flow direction of the flowing mixture within the sensor. The capacitance of the material in the sensor volume is measured, and the tomogram is produced in the form of a two-dimensional matrix as described above. Each value in the matrix corresponds to the electrical permittivity of the material within an associated voxel. The values in the tomogram are then used to calculate multiple points within the sensor volume with the z coordinate of each point being calculated from at least one value of the tomogram. The x and y coordinates of each point correspond to at least one associated voxel of at least one value. Physical characteristics, such as the surface area of the interface between the gas and liquid, are calculated based upon the multiple points and based upon the assumption that the multiple points lie on a hypothetical interface between the first and second phases of the material within the sensor volume. The surface areas and interfaces discussed herein that are used to produce the estimates are hypothetical surfaces. It is highly likely that the hypothetical surfaces do not exist in the form in which they are visualized, but actual surfaces in a flowing mixture do exist that closely correspond in surface area to the hypothetical surfaces. Thus, the areas of the actual are efficiently estimated using the areas of the hypothetical surfaces.

The methods described herein are based on a tomogram corresponding to the flow within a tube. It will be understood that multiple tomograms may be taken over time and the methods may be used to analyze each tomogram and produce an estimated area of an interface for each tomogram, and then the estimated areas may be averaged or filtered to produce smoothed area calculations over time. Also, using the multiple tomograms, an estimated area may be determined for each tomogram and the multiple estimated areas may be analyzed to determine a rate of change of the estimated area over time. In the case of a flowing multiphase material, the rate of change in the estimated area of the interface between the two phases may be used as a predictor of future waves or oscillations in the flowing fluid. In some circumstances, the presence of waves or oscillations in a multiphase flow can cause catastrophic failures and thus such oscillations are to be avoided. Thus, a computer or controller may be programmed to rapidly calculate the area of the hypothetical interface between the two phases in a flowing multiphase material. The computer then calculates the rate of change in the calculated estimated areas and compares it to a predefined limit. If the limit is exceeded, the computer then issues a command to correct the flow. For example, a command may be issued to a valve causing it to open and insert additional materials into the flowing multi-phase materials and thereby corrected the dangerous condition. In extreme cases, the computer may issue a shutdown command that is transmitted to a valve or a pump which will cause the flow to immediately stop.

BRIEF DESCRIPTION OF THE DRAWINGS

The invention may best be understood by reference to various embodiments and variations of the invention, examples of which are described below in conjunction with the drawings in which:

FIG. 3 is a tomogram produced by the sensor shown in FIG. 2a;

FIG. 4b is an isometric drawing of the voxel shown in FIG. 4a;

FIGS. 16a and 16b are illustrations of flow showing three-dimensional and two-dimensional views of the cross-sectional areas of each material phase in the flow;

FIG. 17 is an illustration of a sensor detecting the interface between to materials, salt and air, in the sensor;

DETAILED DESCRIPTION

Figure 1:
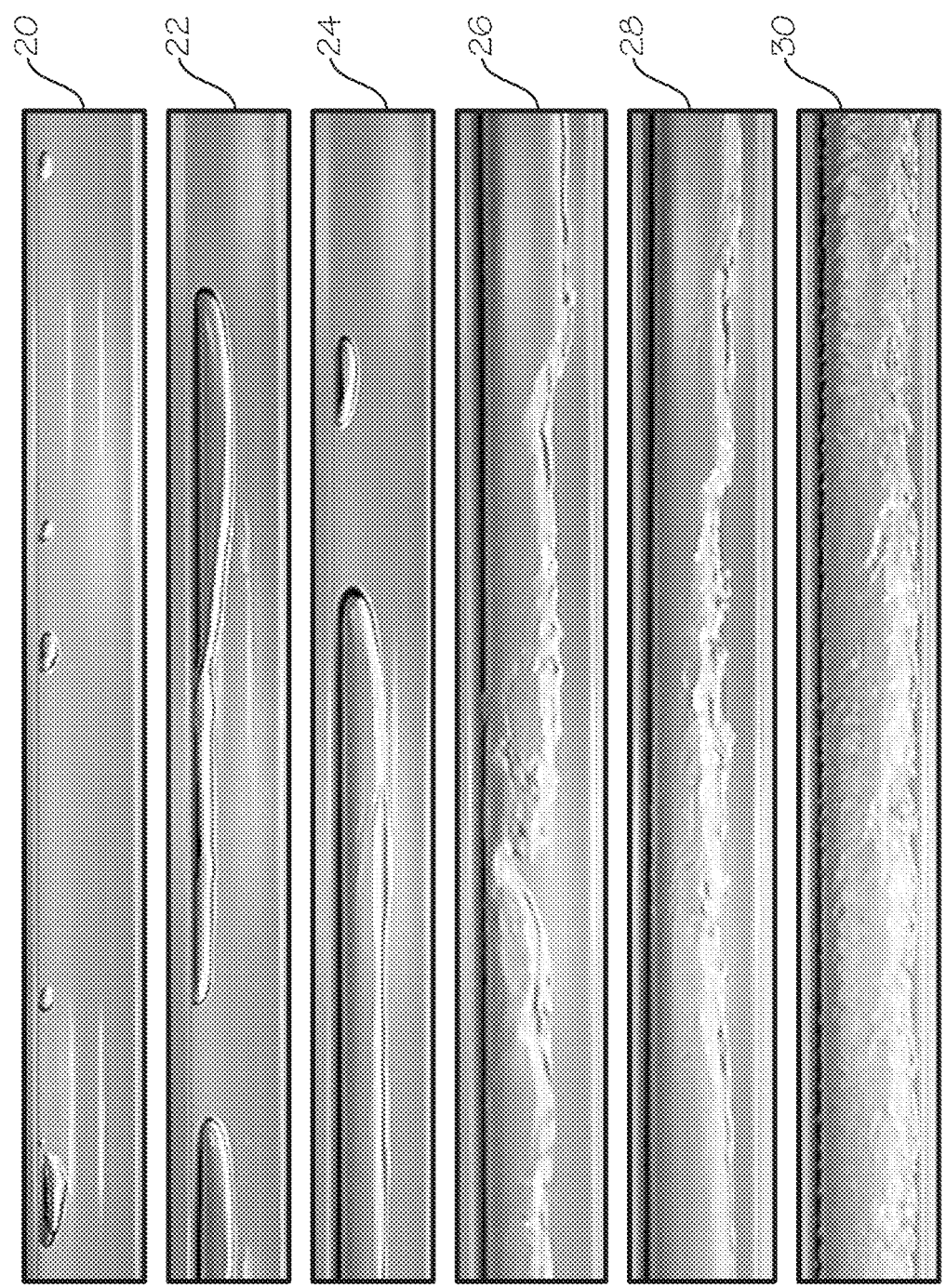
FIG. 1 is an illustration of various different types of multiphase flow in a tube.

Referring now to the drawings in which like reference characters refer to like or corresponding parts or elements throughout the several views, a technique is disclosed to estimate interfacial areas between two materials, such as a liquid and a gas. A technique is also disclosed for estimating interfacial areas between a material and a wall, such as between a liquid and wall and between a gas and a wall in two phase flow. The technique uses a standard 2D sensor in a fashion to infer 3D information about the liquid/vapor profile when the sensor length is much longer than the diameter. It will also allow the cross-sectional flow areas for the gas and liquid to be estimated as a function of the axial dimension of the sensor. The centroid of the mass in the sensor element can also be determined. Tomograms of the flow inside a sensor may, in some embodiments, be created by commercially available electric capacitance tomography (ECT) systems. The methods disclosed herein provide a quantitative interpretation of the tomogram providing estimates of 3D physical area information.

Two phase flows consisting of a liquid and gas phase are common in many applications such as air conditioning, chemical and petroleum industries. Predicting pressure drop and heat transfer rates in these flows typically depends on knowledge of the void fraction which can be defined on an area or volumetric basis. In many cases the flow may be pulsating and chaotic which leads to difficulty in characterizing the interfacial areas between the tube wall and each phase and the interfacial area between each phase. The impact of the interfacial areas, $A_{lw}$, $A_{gw}$, $A_{lg}$ can be seen in the transient one dimensional momentum equations for separated flow given as: [1] (The bracketed numbers refer to references listed at the end of this Detailed Description.)

$$\rho_l \left( \frac{\partial \overline{V}_l}{\partial t} + V_l \frac{\partial \overline{V}_l}{\partial z} \right) = \gamma_l \cos(\theta) - \frac{\tau_{lw} A_{lw}}{\frac{\pi D^2}{4} L} + \frac{\tau_{lg} A_{lg}}{\frac{\pi D^2}{4} L} - \frac{\partial P}{\partial z} \quad (1a)$$

liquid phase $$\rho_g \left( \frac{\partial \overline{V}_g}{\partial t} + V_g \frac{\partial \overline{g}_l}{\partial z} \right) = \gamma_g \cos(\theta) - \frac{\tau_{gw} A_{gw}}{\frac{\pi D^2}{4} L} + \frac{\tau_{lg} A_{lg}}{\frac{\pi D^2}{4} L} - \frac{\partial P}{\partial z} \quad (1b)$$

gas phase (The numbers enclosed within parentheses at the end of equations are equation numbers.) As may be observed in the equations, the transient liquid one dimensional momentum decreases in response to an increase in the area of the liquid/wall interface and increases in response to an increase in the area of the liquid/gas interface. Also, the transient gas one dimensional momentum decreases in response to increases in both the area of the gas/wall interface and the area of the liquid/gas interface. Thus, to understand and predict these momentums, it is important to know or estimate the aforementioned interfacial areas, $A_{lw}$, $A_{gw}$, $A_{lg}$, and such information can be used separately or in conjunction with void fraction information to better predict physical characteristics of the flowing material, such as pressure drop and heat transfer rates.

Figure 13:
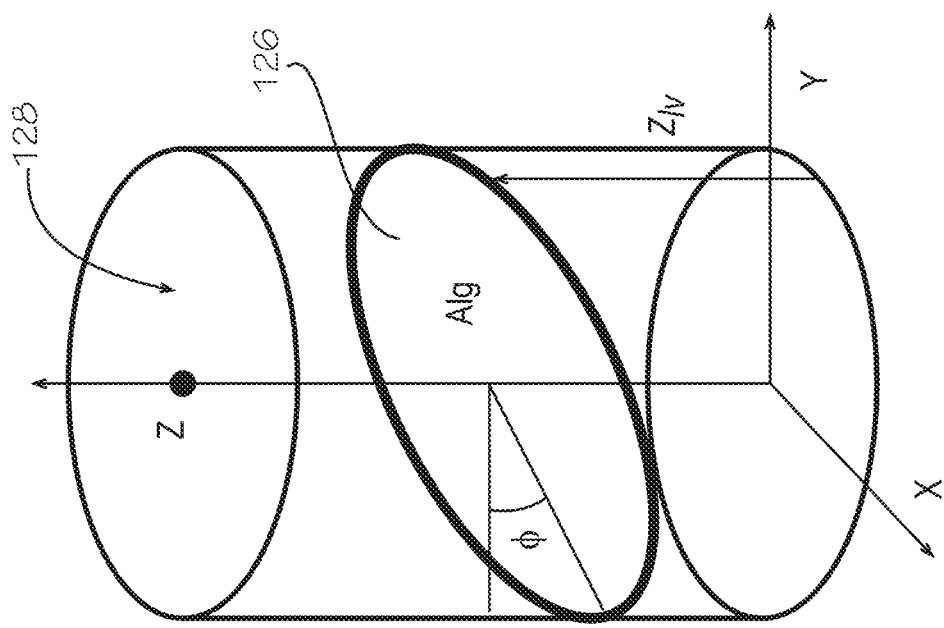
FIG. 13 is an isometric illustration of a test surface use for estimating the error in using a trapezoidal calculation to determine the surface area of the sensor wall and contact with a particular material.

In this discussion, the following nomenclature is used:

Nomenclature $a=x_2-x_1$ the width of a pixel (m)
$A_i$ area of the ith pixel (m$^2$)
$A_{gw}$ interfacial area between gas and wall (m$^2$)
$A_l$ cross sectional flow area of the liquid (m$^2$)
$A_{lg}$ interfacial area between liquid and gas (m$^2$)
$A_{lw}$ interfacial area between liquid and wall (m$^2$)
$A_g$ cross sectional flow area of the gas (m$^2$)
$\overline{A}, \overline{B}$ vectors
$b=y_2-y_1$ the height of a pixel (m)
$C_i$ $i^{th}$ row in the connectivity matrix gives pixel number and the corner node numbers
D diameter (m)
ECT Electric capacitance tomography
H(x) Heaviside step function given in eq. 27
$J_i$ $i^{th}$ Jacobian given by eq. 7
L sensor length (m)
$L_{liq}$ length of a voxel that is occupied by liquid (m)
$m_i$ mass of liquid and gas in the $i^{th}$ voxel (kg)
$n1_i, n2_i, n3_i, n4_i$ corner node numbers for the $i^{th}$ element
$N_{frame}$ number of frames used in a temporal average
NP number of active pixels used in a tomogram (e.g., 812 in the illustrated embodiment)
NBP number of boundary elements (e.g., 88 in the illustrated embodiment)
P pressure (Pa)
R radius of tube (3.5 mm)
$S_i$ area of the $i^{th}$ element on the liquid/gas interface
t time (s)
$\overline{V}$ mean velocity (m/s)
$x_i$ x coordinate of the ith node (m)
$x_{ci}, y_{ci}, z_{ci}$ coordinates of the centroid of the mass in the $i^{th}$ voxel
$\overline{x}, \overline{y}, \overline{z}$ coordinates of the centroid of the mass in the sensor volume
z axial coordinate (m)
$\overline{z}_i$ average value of the $i^{th}$ element of area of wall wetted by liquid or the average of the corner nodes for a liquid/vapor surface element
$\overline{z}_{gi}, \overline{z}_{li}$ centroidal axial location for the gas and liquid respectively in the $i^{th}$ voxel
Subscripts
g gas
l liquid
w wall
Greek Variables
γ specific weight (N/m$^3$)
Δx, Δy lengths of the sides of the square elements (m)
Δθ$_i$ angle subtended by the ith area element of wall wetted by liquid (radians)
ε relative permittivity
ε$_*$ normalized relative permittivity ratio
$\overline{\varepsilon}_*$ spatial average of ε$_*$ over a tomogram
$<\overline{\varepsilon}_*(t)>$ temporal average of $\overline{\varepsilon}_*$
θ angle (radians)
η vertical direction in master element
ξ horizontal direction in master element
ρ density (kg/m$^3$)
τ shear stress (Pa)

φ, φ$_{max}$ angle and maximum value of the angle used in FIG. 13 (radians)
$\varphi_{ij}$ $\varphi_j-\varphi_i$;$\varphi$=x, y, z notation used in eq. 14a.
$\psi_i$ $i^{th}$ shape function used in the interpolation functions given by eq. 8

Many techniques have been used to estimate the void fraction including optical, gamma ray attenuation, and techniques based on either electric resistance or capacitance. The present approach uses an electric capacitance tomographic (ECT) technique to estimate the liquid/vapor interface in flows that may have different physical characteristics as shown in FIG. 1. The flow may include bubbles of gas (phase 1) contained within a flow of liquid (phase 2) as shown by flow 20 of FIG. 1. Alternatively, flow 22 illustrates plugs of gas in a liquid; flow 24 shows slugs; flow 26 shows an intermittent flow of gas; flow 28 shows a stratified wavy flow of gas; and flow 30 shows an annular flow of gas in a liquid. The method described herein estimates the area interfaces of the phases regardless of the type of flow.

Figure 2A:
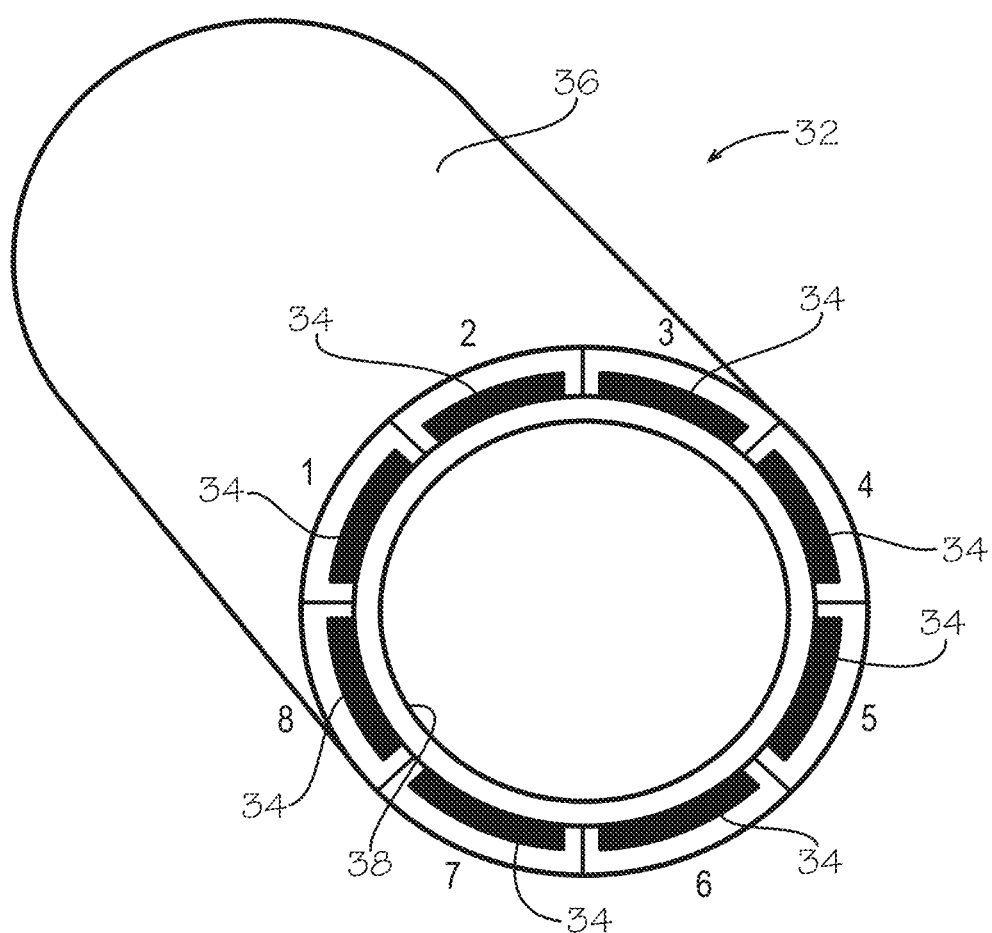
FIG. 2a is a somewhat diagrammatic isometric view of a tubular sensor for measuring capacitance of a flowing material and producing a tomogram of the material.
Figure 2B:
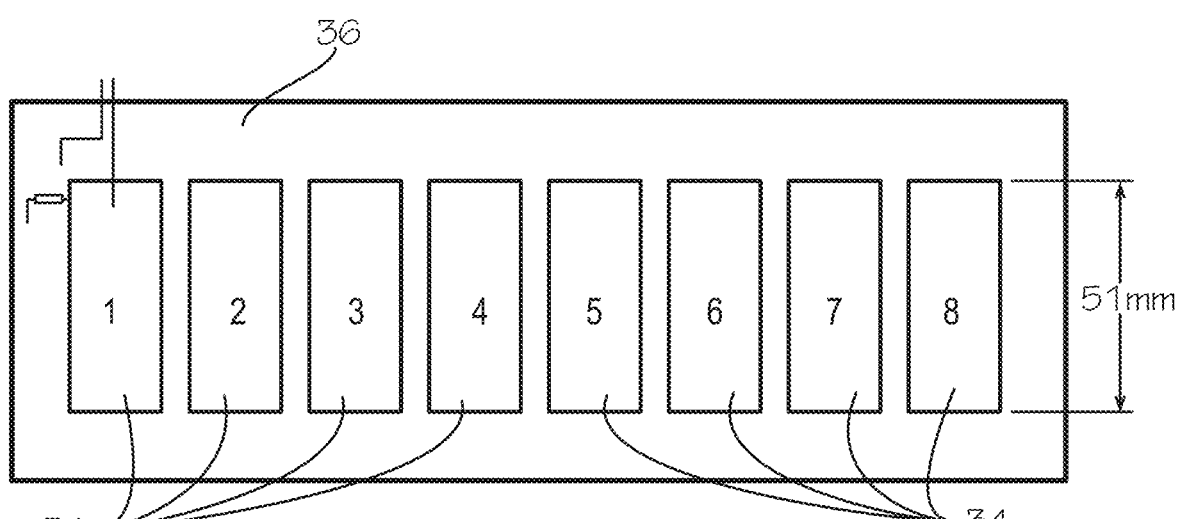
FIG. 2b is a somewhat diagrammatic view of the capacitive sensor shown in FIG. 2a, but the sensor in FIG. 2b is unrolled and shown in a planar configuration for illustrating its construction.

Some embodiments of the invention may use an ECT sensor 32 from Industrial Tomographic Systems [2]. FIG. 2a is a schematic of the sensor 32, which consists of eight electrodes 34 on a flexible printed circuit board 36. In FIG. 2a the sensor 32 is shown in an isometric view as it appears in service wrapped around a tube 38. The measurement volume 40 (See FIG. 4a) is nominally the volume inside the electrodes 34 but is found to be slightly larger due to fringing effects at the ends of the electrodes 34. In FIG. 2b the circuit board 36 is shown unwrapped with the length of the electrodes nominally 51 mm. The tube diameter for the data used in this application is 7 mm so the length to diameter ratio is approximately 7.3. The ECT sensor is measuring capacitance and producing values corresponding to electrical permittivity of the material in the sensor volume 40, and a tomogram is produced in which each value (pixel) in the tomogram is a measurement of electrical capacitance corresponding to the electrical permittivity of a discrete volume (a voxel) within the sensor volume. The measured values are of course absolute value measurements of electrical permittivity that may be calibrated to accurately correspond to the electrical permittivity of the material within the voxels. Accurate absolute permittivity values may be used in the present invention but are not necessary. Instead, for example, normalized permittivity values may also be used. If gas and liquid phases of a material are present in the sensor, all permittivity values may be normalized against the permittivity of the gas. The gas permittivity and the liquid permittivity may each be determined empirically by filling the sensor with the gas and liquid separately and measuring permittivity. There is no need to calibrate those measurements to make them accurate in an absolute sense. Instead, the measurements are normalized against the measured gas permittivity. A normalized liquid permittivity is the liquid permittivity less the gas permittivity. A normalized measured permittivity when both gas and liquid are present is the measured permittivity minus the gas permittivity, and a normalized permittivity ratio is the normalized measured permittivity divided by the normalized liquid permittivity. The method uses the values of the normalized permittivity ratio, ε$_*$, defined in eq. 2 at each pixel to develop the liquid/vapor interface. When a voxel in the sensor is full of gas, the normalized permittivity ratio is zero (0), and when voxel in the sensor is full of liquid, the normalized permittivity ratio is one (1). When the voxel is filled with half liquid and half gas, the normalized permittivity ratio is one half (0.5).

$$\varepsilon_* = \frac{\varepsilon - \varepsilon_g}{\varepsilon_l - \varepsilon_g} \quad (2)$$

$\varepsilon_g$ is the relative permittivity of the gas phase $\varepsilon_l$ is the relative permittivity of the liquid phase $\varepsilon$ is the relative permittivity measured at a given pixel in the tomogram.

Thus a value of $\varepsilon_*=0$ corresponds to gas and $\varepsilon_*=1$ corresponds to a liquid.

Figure 3:
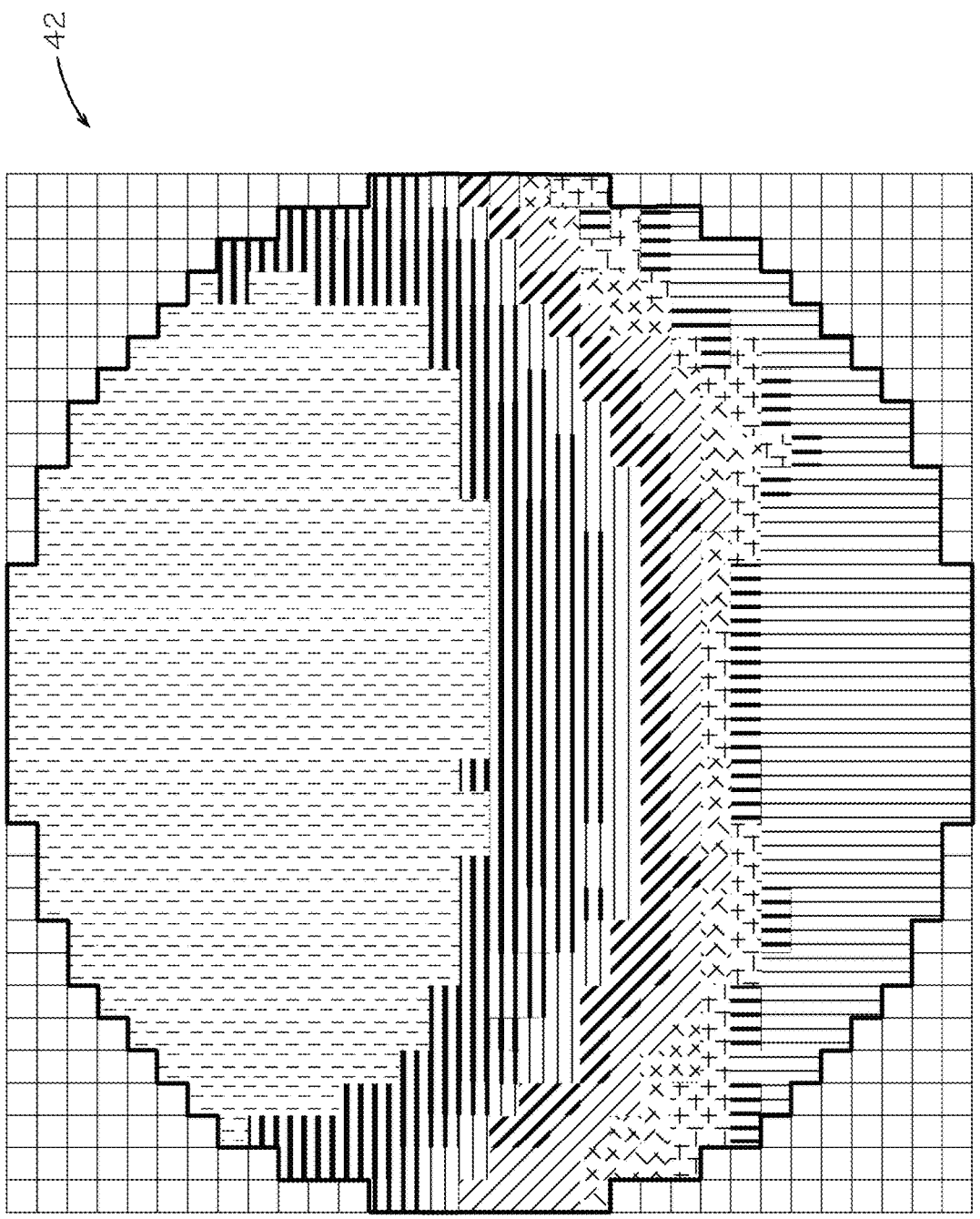

A representative tomogram 42 of a two phase mixture of the refrigerant R134a is shown in FIG. 3. Tomogram 42 is hatched to represent the relative permittivity values in each pixel of tomogram 42. For example, the bottom pixels are hatched with solid vertical lines to indicate a relative permittivity of 1, meaning the lower portion of the sensor value was completely filled with liquid. The hatching and the corresponding relative permittivity are shown in the legend 43. The relative permittivity decreases in the higher areas of the tomogram, and the upper area (hatched with vertical dashes) has the lowest permittivity which is represented in this illustration as a 0.1 relative permittivity. In the past use of this tomogram, an average of the pixel values has been used as an estimate of the liquid fraction at a cross section as given in eq. 3.

$$\bar{\varepsilon}_*(t) = \frac{\sum_{i=1}^{NP} \varepsilon_{*,i}}{NP} \quad (3)$$

NP=812 is the number of active pixels used in the tomogram The spatial value is a function of time and the temporal average given as $$\langle \bar{\varepsilon}_*(t) \rangle = \frac{1}{N_{frame}} \sum_{j=1}^{N_{frame}} \bar{\varepsilon}_{*,j} \quad (4)$$

Here $N_{frame}$ is the number of frames or tomograms that are used in the time average. The void fraction is then estimated as $1-\langle\bar{\varepsilon}_*(t)\rangle$ where the number of frames is large enough to ensure a stationary average.

However, this information can be used in a new method to estimate the liquid profile and thus the interfacial areas as well as the centroids of the gas and liquid regions. It also can be used to calculate the estimated volumetric void fraction of the mixture in the sensor volume.

Liquid/Vapor Interfacial Area

Figure 4A:
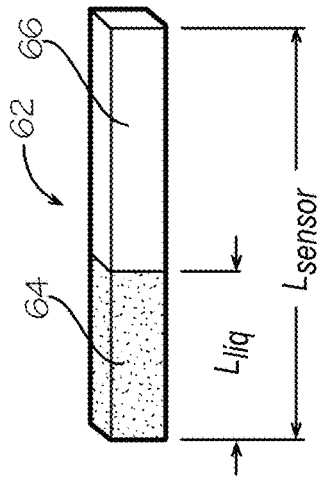
FIG. 4a is an illustration of the tube containing a multiphase flow with a sensor disposed to sense the multiphase flow.
Figure 4B:
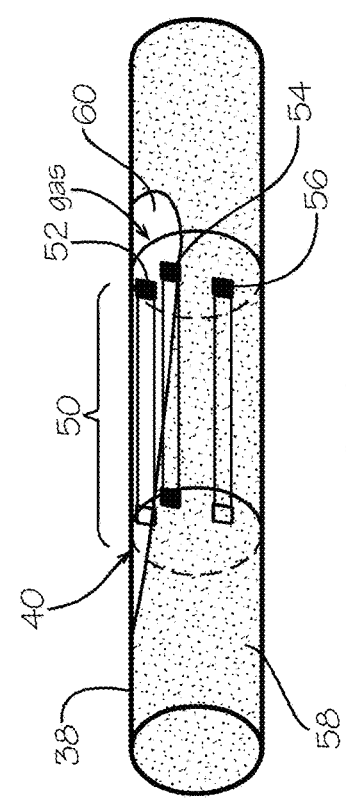
Figure 5A:
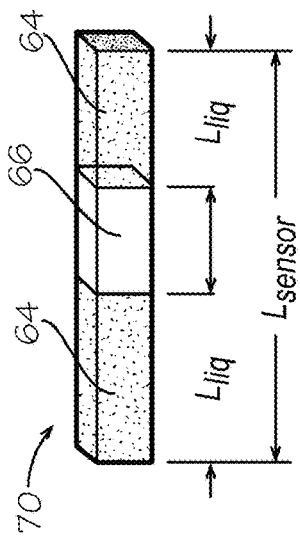
FIGS. 5a-5d are isometric views of voxels with each Fig. showing a different type of multiphase flow of material within the voxel.
Figure 5B:
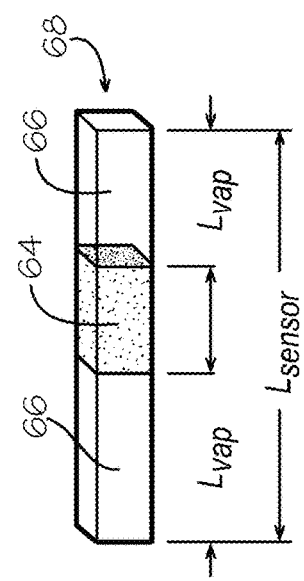
Figure 5C:
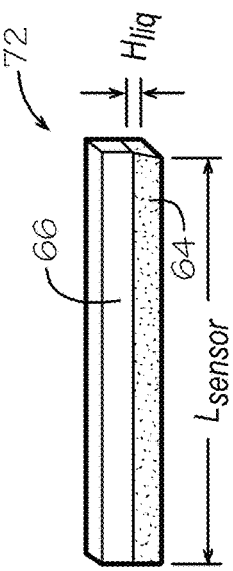
Figure 5D:
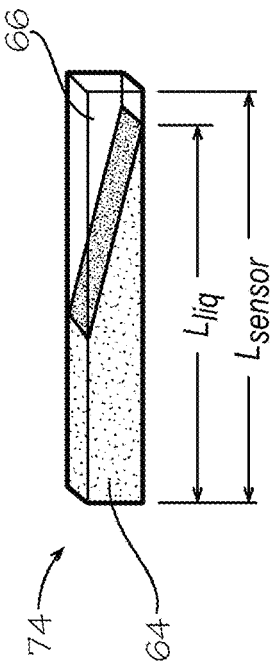

To estimate the liquid profile in the sensor volume, the new method assumes that the pixel value represents the volume fraction of liquid in a rectangular voxel bounded by the pixel area times the length of the sensor as shown in FIGS. 4a and 4b, where FIG. 4a diagrammatically illustrates the sensor volume 40 within a tube 38. In FIG. 4a, three illustrative voxels 52, 54 and 56 are shown extending for the length 50 of the sensor volume 40. A gas slug 60 is shown flowing in the liquid 58 and the gas slug extends beyond both ends of the sensor volume 40.

FIG. 4b shows a hypothetical voxel 62 that may exist in a particular sensor volume 40 at a hypothetical sample time. In voxel 62, the liquid 64 and the gas 66 are separated by a single vertical interface. It is recognized that the voxels within the sensor volume 40 could have other liquid distributions than that shown in FIG. 4b as illustrated in FIGS. 5a-d that diagrammatically illustrate for other voxels 68, 70, 72 and 74. In voxel 68, a drop of liquid 64 is disposed between two regions of gas 66, and in voxel 70 a drop of gas 66 is disposed between two regions of liquid 64. Voxel 72 represents a flow of liquid 64 along the bottom of the voxel 72 with a flow of gas 66 just above the liquid 64, and voxel 74 illustrates a flow in which one inclined interface is disposed between the gas 66 and the liquid 64. The distributions shown as 5a and 5b could occur if there are small drops or bubbles so the method will not be as accurate if the features are less than the sensor length. The distribution shown as 5c could occur in very smooth stratified flow but is unlikely to be seen in practice. The distribution shown as 5d could easily occur. This, however, will be practically the same as the uniform case shown in FIG. 4b because there are 812 pixels in the current sensor with a voxel length to height or width ratio of 232. The tapered section of the liquid profile in a typical flow will be very short. Thus, despite the many different theoretical profiles that might exist in various flows, for purposes of estimating interface areas as described below, the voxels may be deemed to have interfaces as shown in either FIG. 4b or FIG. 5d, and the interface areas may be accurately estimated using such hypothetical interfaces.

Figure 6A:
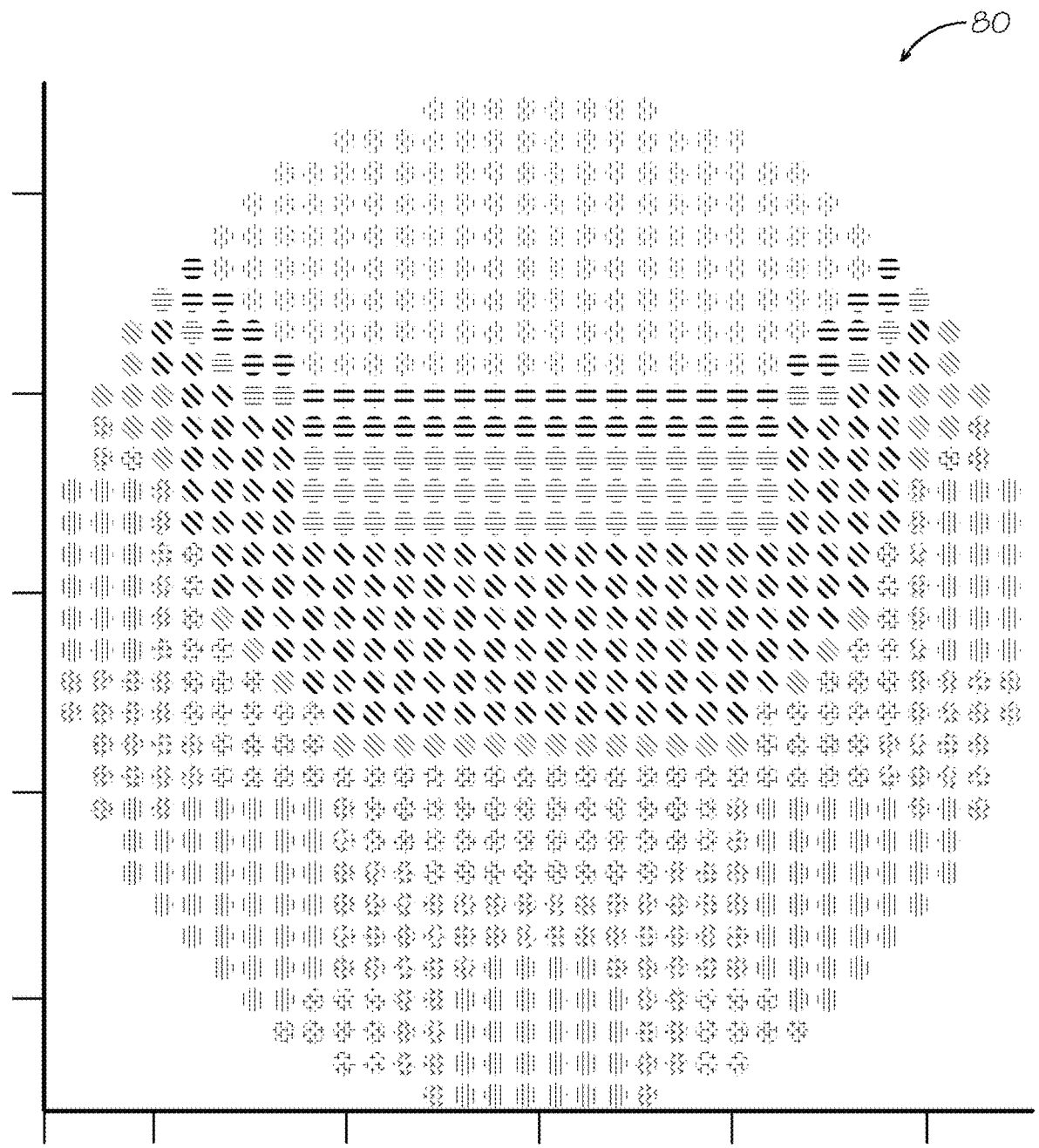
FIG. 6a is a tomogram produced by the sensor of FIG. 2a and corresponding to the illustration of FIG. 6b.

To estimate surface areas, the values from a tomogram, such as tomogram 80 shown in FIG. 6a, are used to calculate points on a hypothetical interface between two phases of material in the sensor volume 40. Once the points are determined, a three dimensional curved surface is mapped through the points and the surface area of that three dimensional curved surface is calculated, which is the estimated surface area between the two phases.

Figure 6B:
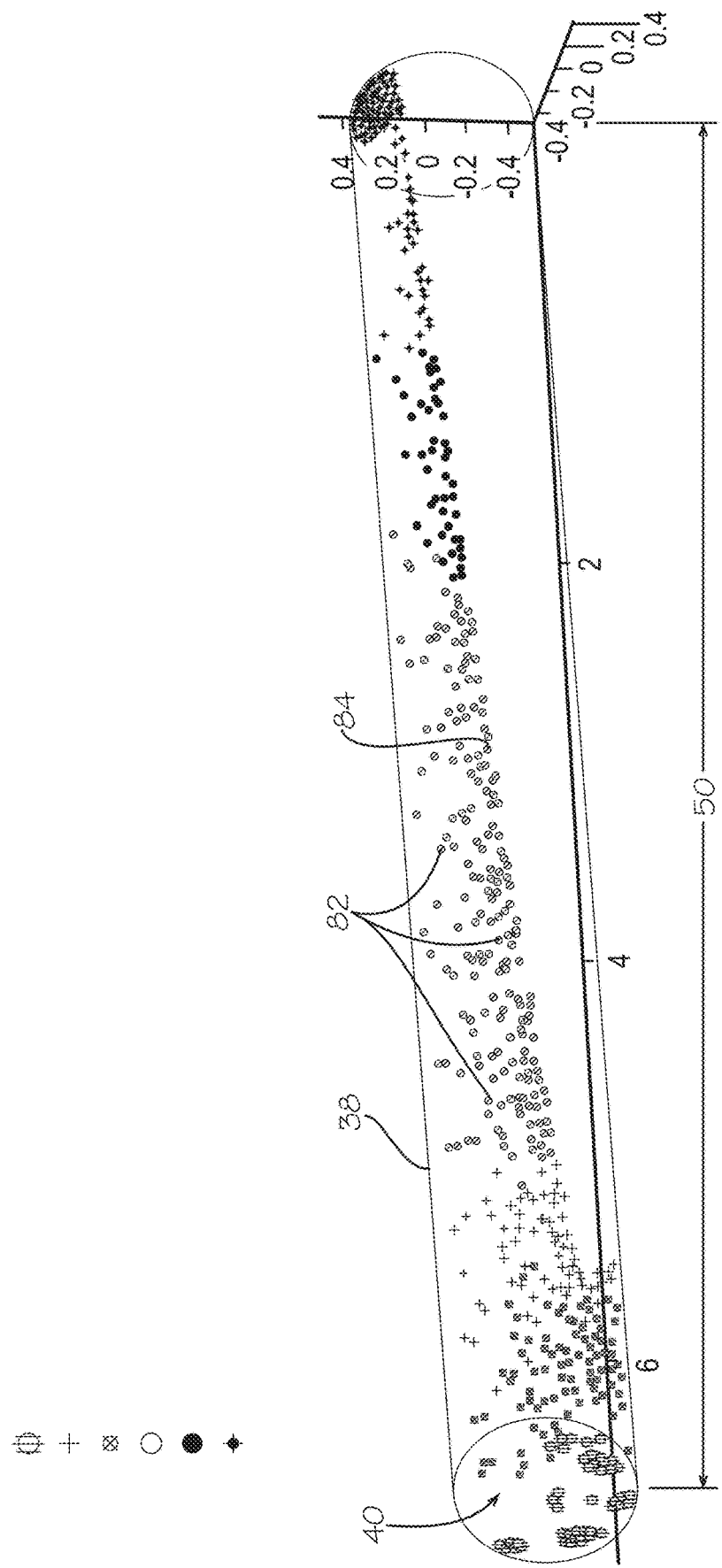
FIG. 6b is an isometric illustration of multiple points in a tube that are mapped to a hypothetical surface corresponding to the interface between a a liquid phase and a gas phase flowing in the tube.

This procedure is discussed in more detail below in connection with FIG. 6a which illustrates a tomogram 80 generated by a sensor 32 that is sensing a gas and liquid flow, and FIG. 6b, which is a somewhat schematic illustration showing the points 82 calculated from the tomogram 80 using the method described above. The liquid vapor interface 84 within a sensor volume 40 for a horizontal tube 38 is shown in FIG. 6b based on the tomogram shown in FIG. 6a. The points in FIG. 6b have hashing symbols corresponding to the hash shading of the pixels in FIG. 6a. The volume below the points 82 is the liquid phase and the gas is represented by the volume above the points 82. In FIG. 6b the length has been normalized by the diameter. This is a qualitative indication so an approach to getting a quantitative value for the interfacial areas will be presented.

Figure 7:
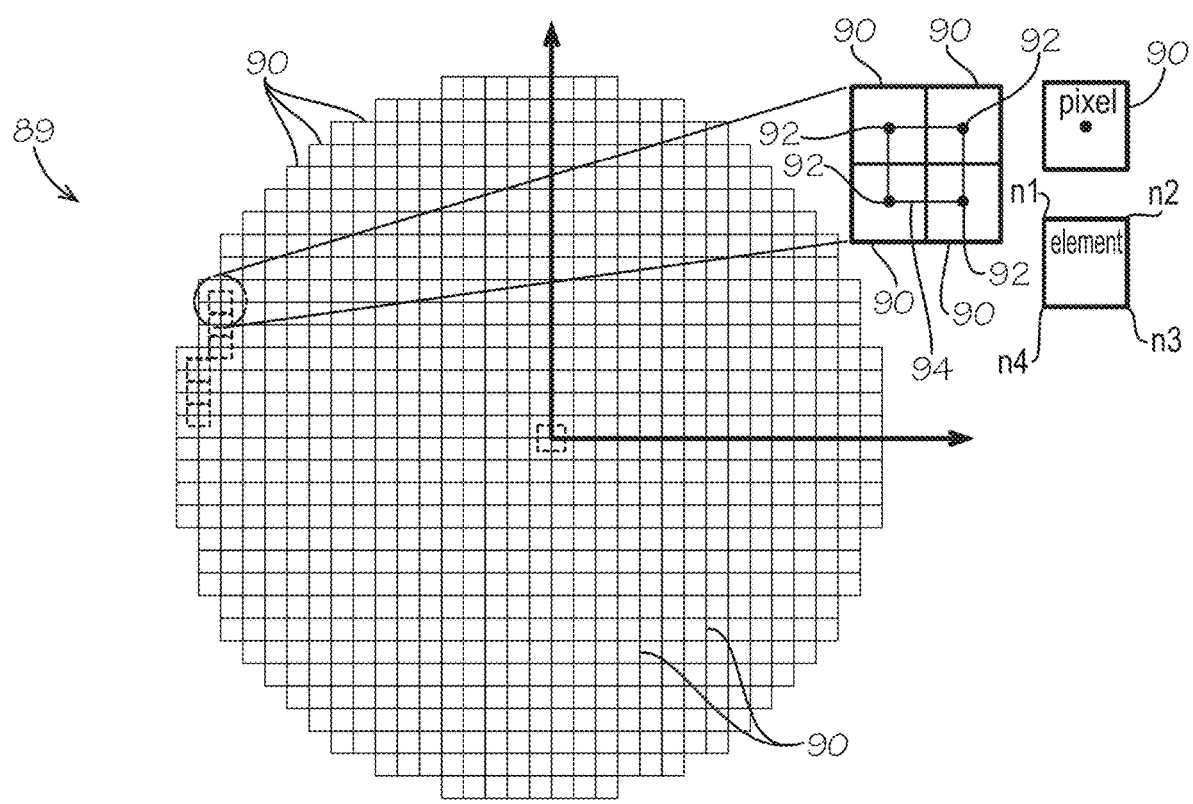
FIG. 7 is a graphical illustration of a tomogram showing the pixels and the elements of the tomogram along with illustrations of points that are derived from the tomogram.
Figure 8:
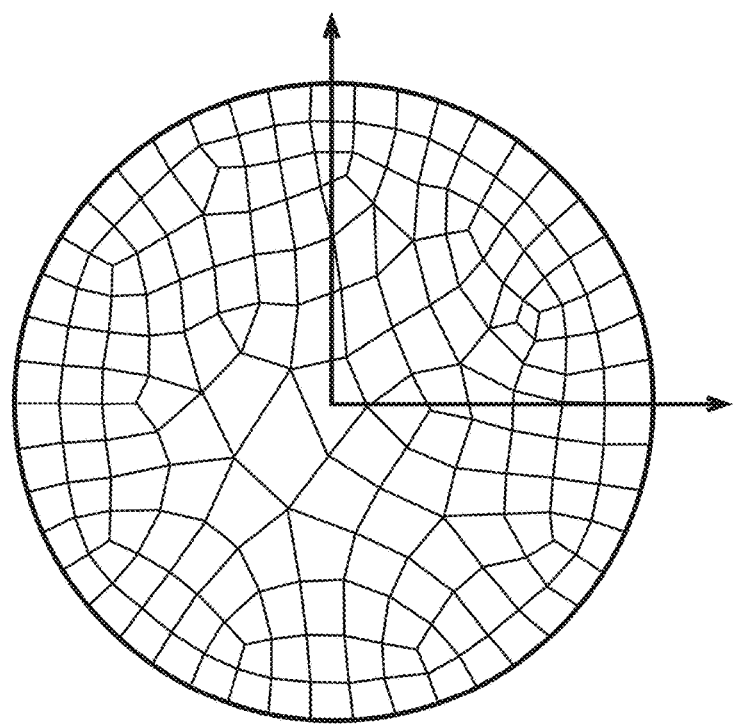
FIG. 8 is an illustration of a non-uniform mesh defined by a plurality of points in three-dimensional space there calculated from a tomogram.

The following discussion for an exemplary embodiment of the invention will use a square mesh, although the described methods may be applied to any non-uniform mesh (such as shown in FIG. 8) as well. FIG. 7 illustrates the pixel 90 locations based on a square mesh, where each square in the mesh is a pixel 90. It has a total of 32×32=1024 pixels but only 812 which are totally inside the tube 38 are used. A new mesh is created from the centroids 92 of each pixel 90, and each square of the new mesh is an element 94.

In summary, the tomogram represents a first square mesh 89 with each square 90 in the mesh representing a pixel. The first step of the disclosed method is to create a second square mesh where the centroids of the first square mesh form the corners of each square element 94 in the second mesh. The second mesh is not fully shown in FIG. 7 to prevent clutter in the illustration, but six of the square elements 94 of the second mesh are shown in FIG. 7, and a magnified view of one square element 94 is shown in the upper right corner of FIG. 7. In the discussion above the squares in the first mesh are referred to as pixels. The squares in the second mesh are called elements, and the corners of the elements are called nodes. This terminology is employed to help distinguish the first mesh from the second mesh. After the second mesh of elements 94 is created as described above, the second mesh of elements 94 is used to calculate the points 82 as shown in FIG. 6b as described below in detail.

A connectivity matrix is created which lists the elements 94 and the four corner node numbers going clockwise around the element 94, $C_i=(i, n1_i, n2_i, n3_i, n4_i)$, where i is the element number and $n1_i, n2_i, n3_i, n4_i$ are the node numbers for the element.

Figure 9:
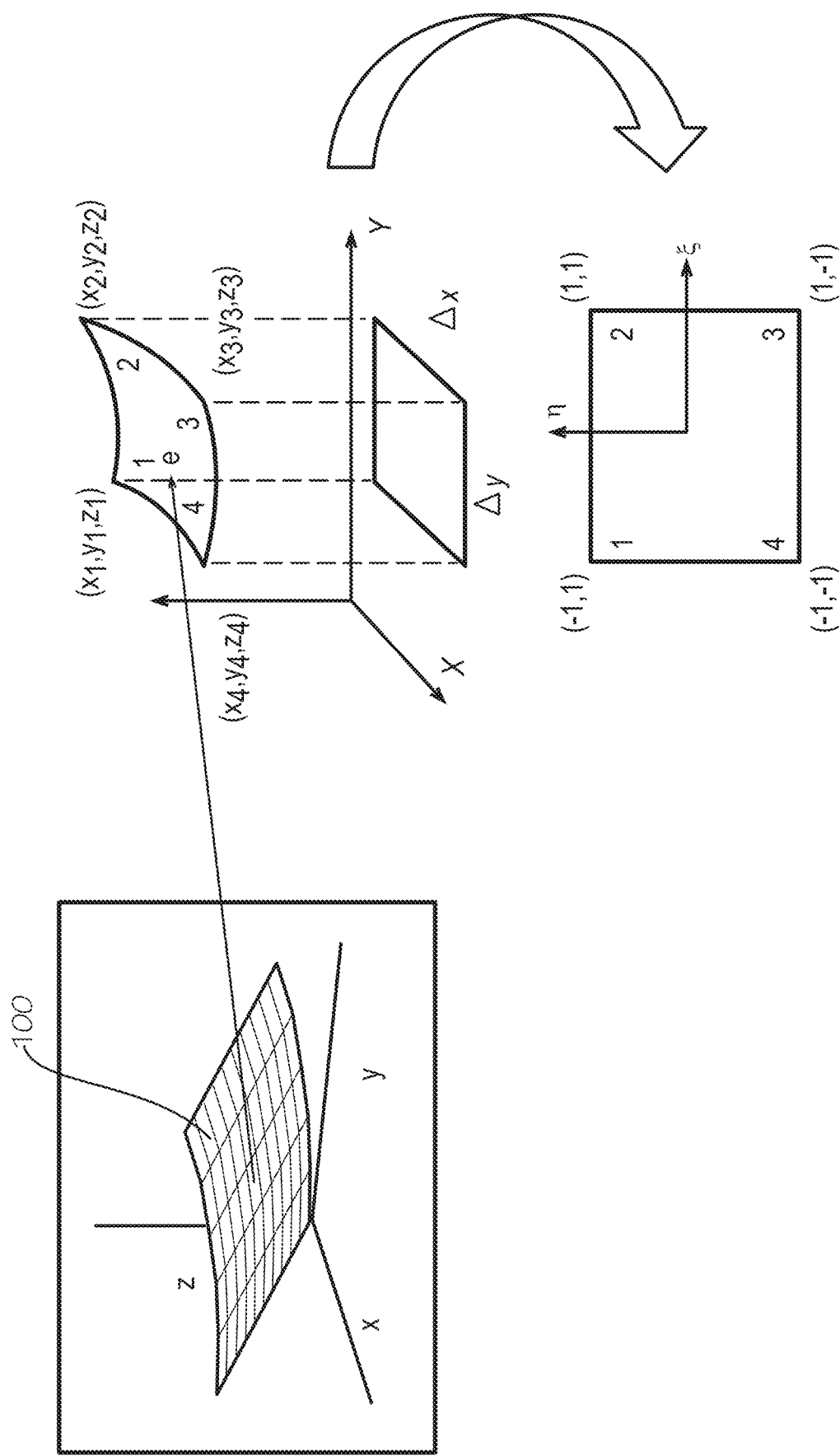
FIG. 9 is a graphical illustration of elements and master elements in a mesh that is calculated from and defined by a plurality of points in three-dimensional space that are calculated from a tomogram.

A matrix corresponding to the x,y,z values of the nodes is also created, where the nodes are the corners of the elements 94, which are also the centroids of the pixels 90. The z value is the measured permittivity ratio from the tomogram times the length 50 of the sensor. The surface elements 94 are thus created and are then mapped to a master element 100 as shown in FIG. 9. The surface elements 94 are mapped to the master element 100 using a linear transformation given by:

$$\xi = \frac{2(x-x_1)-a}{a}; \eta = \frac{2(y-y_1)-b}{b} \quad (5a, b)$$

where $a=x_2-x_1$; $b=y_2-y_1$ are the lengths of the sides of the pixels 90. The area of the $i^{th}$ element is then given as: [4]

$$S_i = \int_{-1}^{1}\int_{-1}^{1} \sqrt{J_1^2+J_2^2+J_3^2} \, d\xi d\eta \quad (6)$$

$J_i$ are the Jacobians and depend on the mapping function and the element geometry. The Jacobians are given by:

$$J_1 = \begin{vmatrix} \frac{\partial y}{\partial \xi} & \frac{\partial y}{\partial \eta} \\ \frac{\partial z}{\partial \xi} & \frac{\partial z}{\partial \eta} \end{vmatrix}; J_2 = \begin{vmatrix} \frac{\partial z}{\partial \xi} & \frac{\partial z}{\partial \eta} \\ \frac{\partial x}{\partial \xi} & \frac{\partial x}{\partial \eta} \end{vmatrix}; J_3 = \begin{vmatrix} \frac{\partial x}{\partial \xi} & \frac{\partial x}{\partial \eta} \\ \frac{\partial y}{\partial \xi} & \frac{\partial y}{\partial \eta} \end{vmatrix} \quad (7)$$

For the chosen geometry and nodes, first order interpolation functions are used to describe the coordinates in terms of the transformed variables and the nodal coordinates. Higher order functions can be described but additional nodes would be needed for each element. Thus, $$x = \sum_{i=1}^{4} x_i \psi_i(\xi, \eta); y = \sum_{i=1}^{4} y_i \psi_i(\xi, \eta); z = \sum_{i=1}^{4} z_i \psi_i(\xi, \eta); \quad (8)$$

$$\psi_1(\xi, \eta) = \frac{1}{4}(1-\xi)(1+\eta); \psi_2(\xi, \eta) = \frac{1}{4}(1+\xi)(1+\eta)$$

$$\psi_3(\xi, \eta) = \frac{1}{4}(1+\xi)(1-\eta); \psi_4(\xi, \eta) = \frac{1}{4}(1-\xi)(1-\eta)$$

The $x_i, y_i, z_i$ values are the coordinates for the $i^{th}$ node.

The Jacobians can now be found from eq. 7. This will hold for the uniform mesh shown in FIG. 7 or a non-uniform mesh such as that shown in FIG. 8. All that is needed are the nodal locations.

As illustrated in FIG. 9 (a graphical illustration of elements and a master element), for the uniform mesh with constant $\Delta x$ and $\Delta y$ the Jacobians are:

$$J_1 = \frac{-\Delta y}{8}[(z_2-z_1)(1+\eta) + (z_3-z_4)(1-\eta)] \quad (9a)$$

$$J_2 = \frac{-\Delta x}{8}[(z_2-z_3)(1+\xi) + (z_1-z_4)(1-\xi)] \quad (9b)$$

$$J_3 = \frac{\Delta x * \Delta y}{4} \quad (9c)$$

This can be shown to be equivalent to using an expression from Larson et al page 1032. [5] The expression for the surface is given as $z=f(x,y)$ over a square region R given by $x_1 \le x \le x_2$; $y_1 \le y \le y_2$. The area is given as:

$$S_i = \int_{y_1}^{y_2}\int_{x_1}^{x_2} \sqrt{1+\left(\frac{\partial f}{\partial x}\right)^2+\left(\frac{\partial f}{\partial y}\right)^2} \, dxdy \quad (10)$$

Here the same mapping to a master element 100 and linear interpolation functions are used and the interface written as $z(\xi,\eta)$. The partial derivatives are evaluated using the chain rule and the area becomes:

$$S = \quad (11)$$

$$\int_{-1}^{1}\int_{-1}^{1} \sqrt{1+\left(\frac{2}{a}\sum_{i=1}^{4} z_i \frac{\partial \psi_i(\xi,\eta)}{\partial \xi}\right)^2 + \left(\frac{2}{b}\sum_{i=1}^{4} z_i \frac{\partial \psi_i(\xi,\eta)}{\partial \eta}\right)^2} \left(\frac{ab}{4}\right) d\xi d\eta$$

Comparing eq. 11 with eq. 6 after eq. 7 and 8 have been substituted it can be seen to be the same for the special case of square elements. The area of a given element 94 is found using Gauss-Legendre quadrature. [6]

$$S_i = \int_{-1}^{1}\int_{-1}^{1} \sqrt{J_1^2+J_2^2+J_3^2} \, d\xi d\eta \approx \sum_{i=1}^{2}\sum_{j=1}^{2} f(\xi_i, \eta_j)w_i w_j \quad (12)$$

$$f(\xi_i, \eta_j) = \sqrt{J_1^2(\xi_i,\eta_j)+J_2^2(\xi_i,\eta_j)+J_3^2(\xi_i,\eta_j)} \, w_i = w_j = 1 \quad (13a)$$

$$(\xi_i, \eta_j) = .577350269189626 * \begin{pmatrix} (-1, 1) \\ (1, 1) \\ (1, -1) \\ (-1, -1) \end{pmatrix} \quad (13b)$$

The integration reduces to the sum of 4 integrand evaluations at the locations given in equation 13b. For the uniform mesh, only differences in z at the nodes need to be calculated for each element. The other terms are the same for all elements and only need to be calculated once. The total area is the sum of the areas of the elements 94.

Alternative Method to Finding the Area

Figure 10:
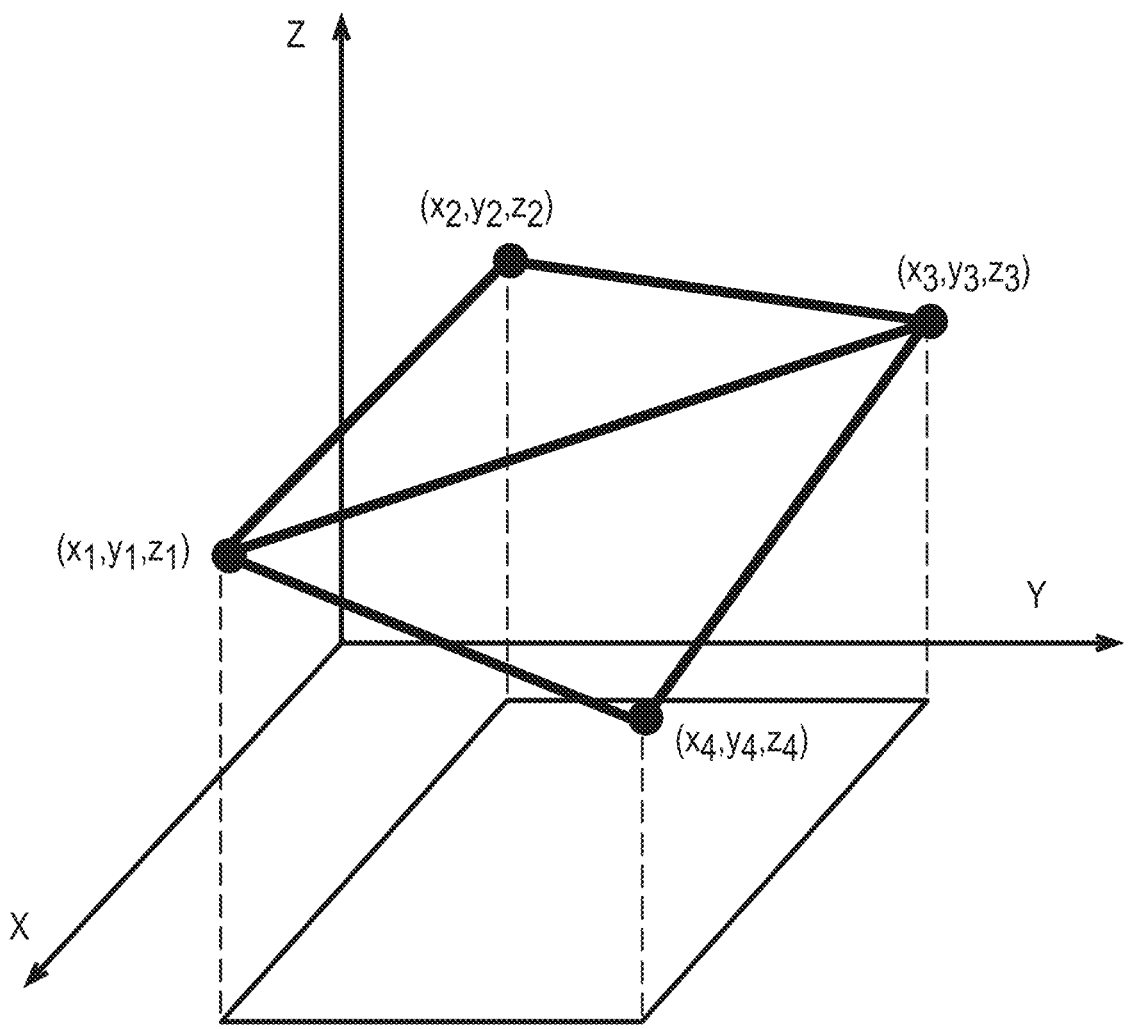
FIG. 10 is a graphical illustration of how each four-sided element of a mesh is broken into two triangular planar surfaces which are then used to calculate the surface area of a mapped surface.

The above described method of mapping a surface to the points 82 of FIG. 6b uses a precise curved three-dimensional surface and produces highly accurate results in terms of mapping a curved surface and calculating the area. However, since the objective is to estimate the surface area of the gas/liquid interface, a less precise form of mapping is normally sufficient. One alternative method to find the surface area is to subdivide all the square elements 94 into two triangles as shown in FIG. 10. Each triangle lies in its own plane so the cross product of vectors along two sides can be used to determine the area of each triangle. This creates two plane facets instead of the potentially curved surface that would be obtained with the previous shape functions. Here the surface area of the interface 84 of FIG. 6b is given as:

$$S_i = \frac{1}{2}\sqrt{(y_{42}z_{13} - z_{42}y_{13})^2 + (z_{42}x_{13} - x_{42}z_{13})^2 + (x_{42}y_{13} - y_{42}x_{13})^2} \quad (14)$$

$$\varphi_{ij} = \varphi_j - \varphi_i; \varphi = x, y, z \quad (14a)$$

The differences in the x and y directions are constant for the uniform mesh and would only need to be evaluated once. For a non-uniform mesh they would need to be calculated for each element.

Liquid Wetted Area

Another surface area that may be calculated using the pixel data from the tomogram 80 is the surface area of the interface between the liquid (or the gas) and the wall of the tube 38 within the sensor 32 (FIG. 2a). The area of the tube 38 within the sensor volume 40 that is wetted by liquid can be estimated by using the values (normalized permittivity ratios) of the boundary pixels 110 shown in the tomogram 112 of FIG. 11a. First a hypothetical wall boundary between the gas and the liquid is generated using only the values of the boundary pixels, and thus the hypothetical boundary would be a curved boundary line on the surface of the tube 38.

Figure 11B:
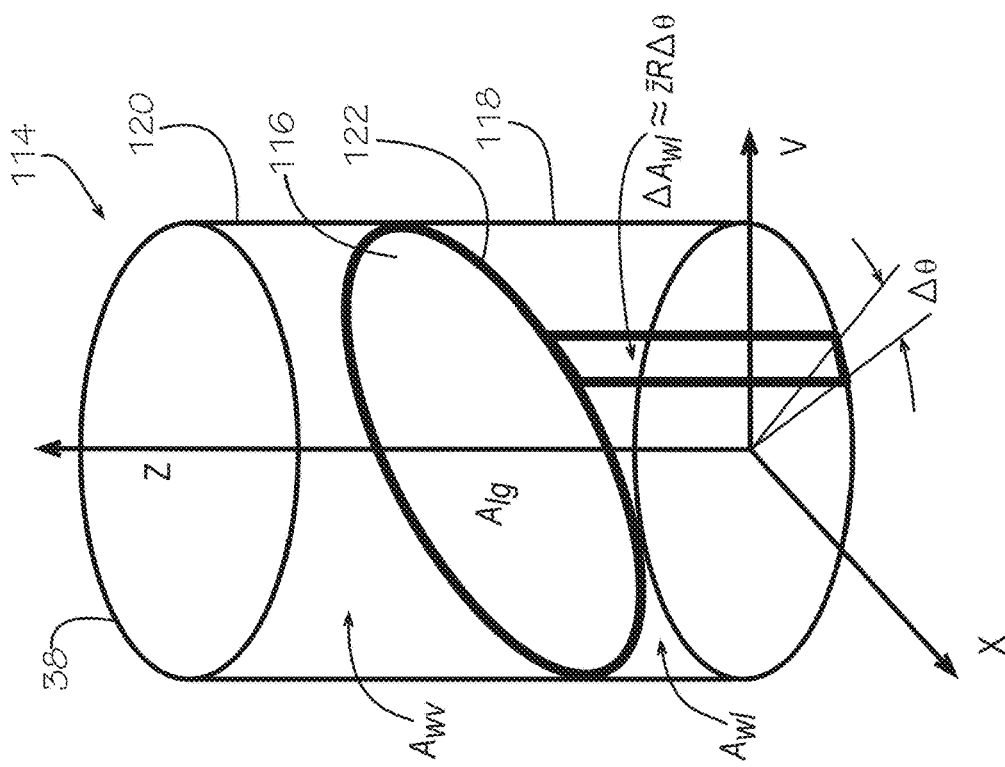
FIG. 11b is an isometric illustration of the hypothetical boundary line to surface areas on the wall of the sensor.
Figure 11A:
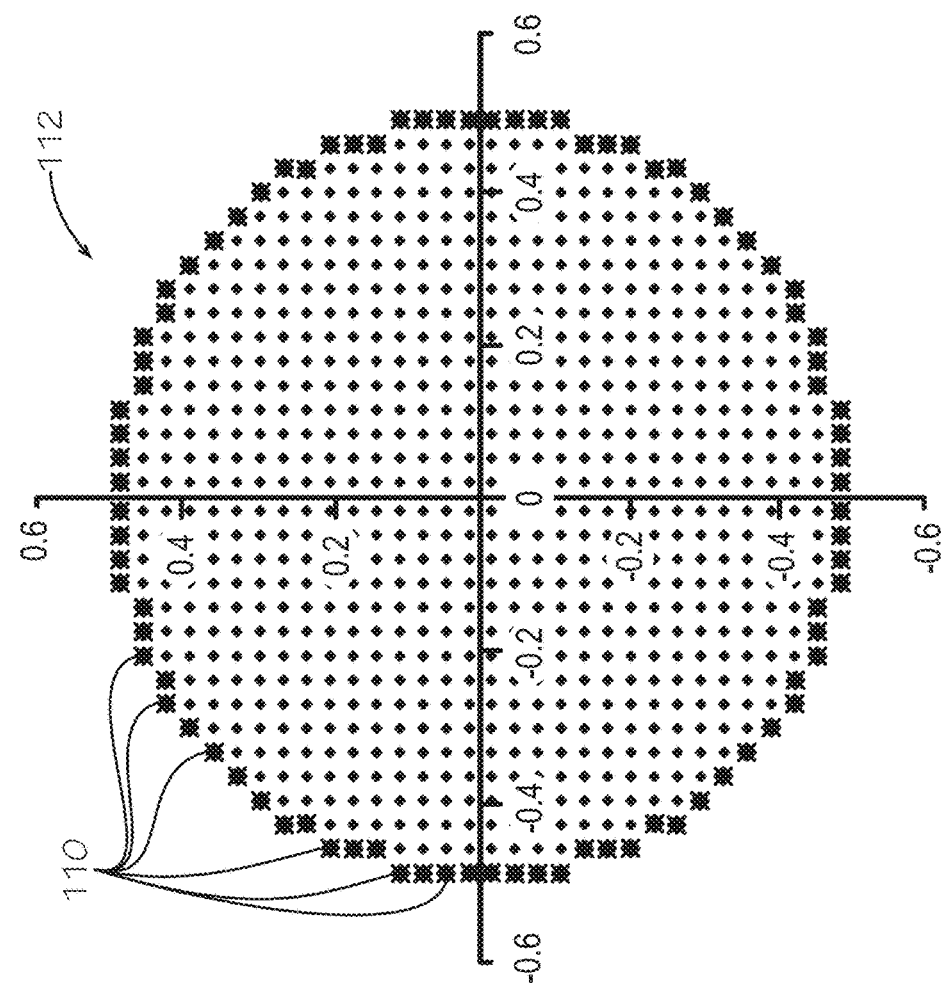
FIG. 11a is a graphical illustration of the outermost boundary pixels of the tomogram.

FIG. 11b shows a vertical sensor volume 114 within a tube 38 with a hypothetical wall boundary between liquid and gas represented by the ellipse 116, which is a simplified example for illustration purposes. The perimeter 122 of the ellipse would constitute the boundary between the liquid and the gas along the wall of the tube 38. The liquid is below the ellipse 116 and the gas is above the ellipse 116, and the surface area 118 of the wall of the tube 38 below the ellipse would be the surface area of the liquid/wall interface, and the surface area 120 above the interface represents the gas/wall interface.

The liquid/wall interface surface area 118 is found by integration around the tube perimeter and is demonstrated using the trapezoidal rule although other methods could be used.

$$A_{wl} = \int_0^{2\pi} dA = \int_0^{2\pi} zR d\theta \approx \sum_{i=1}^{NBP} \bar{z}_i R \Delta \theta_i \quad (15)$$

NBP is the number of boundary pixels 110. From the uniform $$z_i = L\varepsilon_{*,i} \text{ and } \bar{z}_i = \frac{L}{2}(\varepsilon_{*,i} + \varepsilon_{*,i+1}).$$

For the last segment the first boundary pixel is used for $z_{i+1}$. This completes the circle around the tube.

Figure 12:
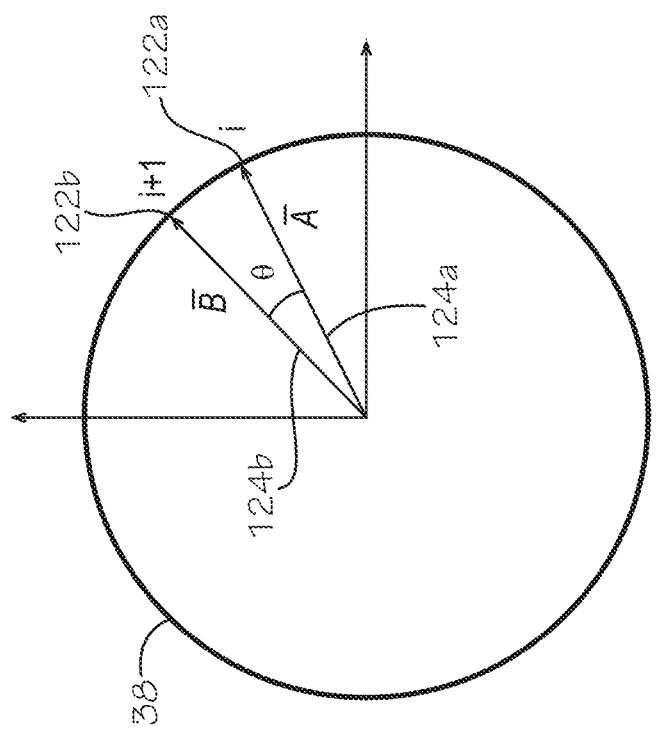
FIG. 12 is a graphical illustration of representative consecutive boundary pixels and the vectors used to find the angle between the pixels.

With the uniform mesh, the arc lengths corresponding to the segments defined by the boundary pixels 110 aren't the same. In some meshes $\Delta \theta_i$ may be a constant but the following approach will find the appropriate value using the boundary pixel 110 locations. The pixels 110 are first sorted in a clockwise or counter clockwise fashion. The location of the centroid (e.g. centroids 122a and 122b) of each pixel represents a vector (e.g., vectors 124a and 124b) extending radially from the center of the tube 38 to the pixel as shown in FIG. 12. By taking the dot product of the vectors associated with adjacent pixels 110, the cosine of the angle between the vectors can be found as:

$$AB\cos(\theta) = \quad (16)$$

$$\bar{A} \cdot \bar{B} \rightarrow \theta_i = a\cos\left(\frac{\bar{A} \cdot \bar{B}}{AB}\right) = a\cos\left(\frac{x_i x_{i+1} + y_i y_{i+1}}{\sqrt{(x_i^2 + y_i^2)(x_{i+1}^2 + y_{i+1}^2)}}\right)$$

and the area of the wall of tube 38 wetted by liquid is approximated as:

$$A_{wl} \approx \frac{RL}{2} \sum_{i=1}^{NBP} (\varepsilon_{*,i} + \varepsilon_{*,i+1}) \Delta \theta_i \quad (17)$$

The area of the tube in contact with vapor (gas) is just the total tube area minus the liquid wetted area or $$A_{wg} \approx \left[\pi DL - \frac{RL}{2}\sum_{i=1}^{NBP}(\varepsilon_{*,i} + \varepsilon_{*,i+1})\Delta\theta_i\right] = \quad (18)$$

$$DL\left[\pi - \frac{1}{4}\sum_{i=1}^{NBP}(\varepsilon_{*,i} + \varepsilon_{*,i+1})\Delta\theta_i\right]$$

In practice, $A_{wg}$ would calculated as $A_{wg} = \pi DL - A_{wl}$.

The error in using this technique has two components. The first is associated with using the simple trapezoidal rule for the integration as opposed to a more complex formula. The second is approximating the values of $\varepsilon_{*,i}$ at the tube wall as the values given by the centroids of the boundary pixels 110. The error associated with using the trapezoid rule can be estimated by looking at a case where the liquid/vapor interface forms a plane 126 that intersects the sensor volume 128 as shown in FIG. 13. In this case the error between the exact solution and the trapezoidal rule was less than 0.35% for all values of $\phi/\phi_{max} \le 1$, which represents all possible angles of the interface 126. This is much smaller than the expected error in the values for $\varepsilon_*$ (normalized relative permittivity ratio). For purposes of estimation, this error is acceptable.

Volumetric Void Fraction

It is recognized that the information taken from a tomogram such as tomogram 42 of FIG. 3 is volumetric in nature due to the length of the electrodes 34 (FIG. 2b). The percentage of the measurement volume 40 occupied by liquid can also be estimated if there are no bubbles in the liquid or drops in the gas. The volume beneath the liquid/gas interface surface z=f(x,y) is given as $$V = \iint_A {}^1f(x,y)dxdy = \iint_A {}^1f(x,y)J_3 d\xi d\eta \quad (19)$$

Figure 14:
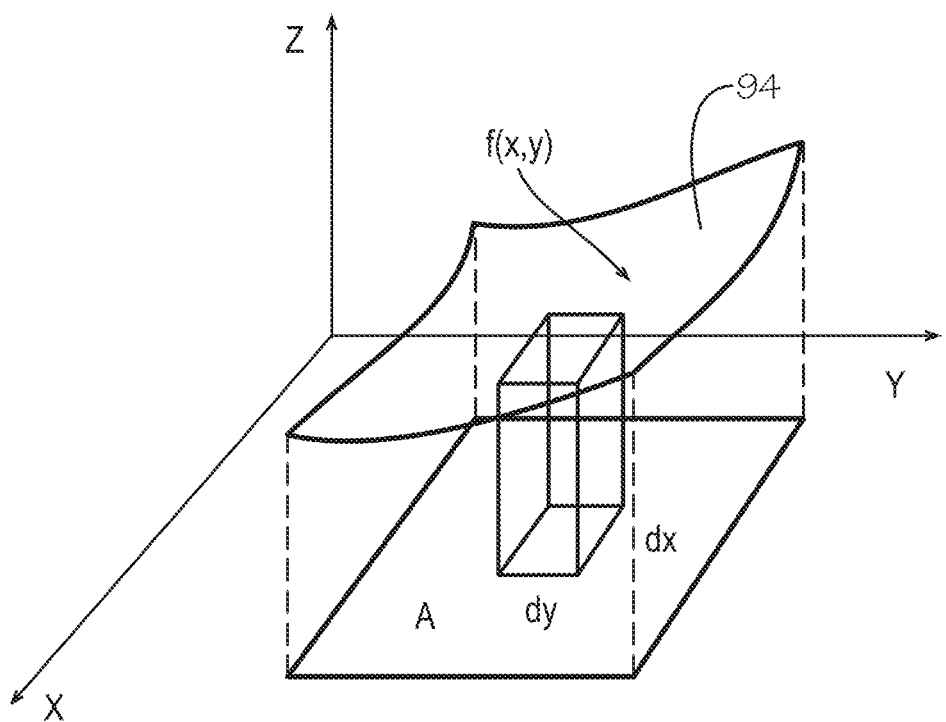
FIG. 14 is a graphical isometric illustration of an element or voxel for purposes of describing how the volume of an element is calculated.

The volume under a surface f(x,y) is illustrated in FIG. 14. Using the same bilinear mapping for the elements 94 as that used to find the liquid/vapor interfacial area the volume under an element 94 is given as:

$$V_i = \int_{-1}^1 \int_{-1}^1 J_3 \sum_{i=1}^4 z_i \psi_i(\xi, \eta) d\xi d\eta = \quad (20)$$

-continued $$\frac{\Delta x * \Delta y}{16} \int_{-1}^{1} \int_{-1}^{1} [z_1(1-\xi)(1+\eta) + z_2(1+\xi)(1+\eta) +$$

$$z_3(1+\xi)(1-\eta) + z_4(1-\xi)(1-\eta)] d\xi d\eta$$

As with the area calculation, this can be written for a non-uniform mesh with higher order interpolation functions as well. Evaluating eq. 20 gives $$V_i = \frac{\Delta x * \Delta y}{4}(z_1 + z_2 + z_3 + z_4) = \Delta x * \Delta y * \bar{z} \quad (21)$$

This is just the average value, $\bar{z}$, at the nodes (n1, n2, n3, n4) times the area of the pixel 90. This is exact under the assumption of the bilinear variation of z over the element. This variation can be shown to be equivalent to $z = a_0 + a_1 x + a_2 y + a_3 xy$. The total volume under the liquid/vapor interface is the sum of the volumes under each element. The liquid volume fraction is the liquid volume divided by the sensor volume and the volumetric void fraction is one minus the volumetric liquid fraction. In general, the volumetric void fraction is not the same as $\bar{\varepsilon}_*$.

Centroid of the Fluid Mixture in the Sensor Volume

The centroid of the fluid mixture can also be found from the tomogram data. Referring to FIG. 7, x and y components of each centroid 92 ($x_{ci}$, $y_{ci}$) and the area of each pixel 90 are known. The mass of each voxel 62 is $m_i = \rho_i A_i L$. The mean density is given as $$\rho_i = \rho_g + \varepsilon_{*,i}(\rho_l - \rho_g) \quad (22)$$

The coordinates for the centroid of the mass in the sensor volume is given by $$\bar{x} = \frac{\sum_{i=1}^{NP} m_i x_{ci}}{\sum_{i=1}^{NP} m_i} \quad \bar{y} = \frac{\sum_{i=1}^{NP} m_i y_{ci}}{\sum_{i=1}^{NP} m_i} \quad \bar{z} = \frac{\sum_{i=1}^{NP} m_i z_{ci}}{\sum_{i=1}^{NP} m_i} \quad (23a, b, c)$$

Figure 15:
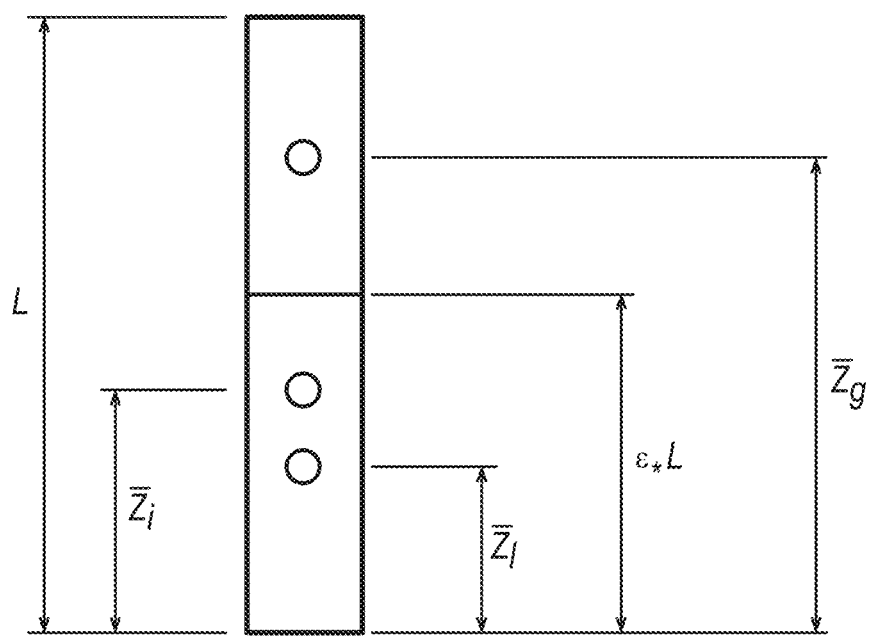
FIG. 15 is a schematic diagram of a voxel showing two different phases within the voxel.

To find $\bar{z}$, $z_{ci}$ must be calculated. This can be found by referring to a schematic of a voxel as given in FIG. 15.

$$z_{ci} = \frac{m_{li} z_{li} + m_{gi} z_{gi}}{m_i} = \frac{\rho_l \varepsilon_{*,i} z_{li} + \rho_g (1 - \varepsilon_{*,i}) z_{gi}}{\rho_i} \quad (24)$$

$$\bar{z}_{li} = \frac{L \varepsilon_{*,i}}{2} \quad \bar{z}_{gi} = L \varepsilon_{*,i} + (1 - \varepsilon_{*,i})\frac{L}{2} = \frac{L}{2}(1 + \varepsilon_{*,i}) \quad (25a, b)$$

Substituting into 23c gives $$\bar{z} = \frac{L}{2} \frac{\sum_{i=1}^{NP} [\rho_g + (\varepsilon_{*,i})^2 (\rho_l - \rho_g)]}{\sum_{i=1}^{NP} \rho_i} \quad (26)$$

Cross Sectional Flow Areas

The cross-sectional flow area 150 for the gas, $A_g$, and the cross sectional flow area 152 for the liquid, $A_l$, phases are shown in FIGS. 16a and 16b, and can also be estimated from the pixel values of the tomogram 80. The liquid cross sectional area in the sensor 32 can also be approximated if the uniform cross section distribution is used. It is simply the fraction of pixels with lengths calculated from the permittivity ratios greater than a particular value of z. i.e.

$$A_l(z) = \frac{\pi D^2}{4 * NP} * \sum_{i=1}^{NP} H\left(\varepsilon_{*,i} - \frac{z}{L}\right) \text{ where } H(x) = \begin{cases} 1 \text{ if } x \geq 0 \\ 0 \text{ if } x < 0 \end{cases} \quad (27)$$

$$A_g(z) = \frac{\pi D^2}{4} - A_l(z) \quad (28)$$

Eq. 27 assumes the area of each pixel is the same. If they are different the expression can be expressed as:

$$A_l(z) = \sum_{i=1}^{NP} A_i H\left(\varepsilon_{*,i} - \frac{z}{L}\right) \quad (29)$$

Here $A_i$ is the area of the $i^{th}$ pixel and would be calculated once for a given mesh using Gauss-Legendre quadrature. These areas can be can be retained in this discrete form or curve fit to provide a smoother approximation to the area. This also allows an approximation of the gradients in the axial direction of the flow areas either in a finite or continuous fashion. The cross sectional area of a particular material (e.g. liquid) in the sensor (such as sensor 32) will vary depending on the z position within the sensor. One method of estimating an average cross sectional area of a material in the flow would be to determine the cross sectional area at multiple z positions within a sensor. For example, the cross sectional area of the liquid could be calculated at every 0.1 inch along the length of the sensor and then those areas could be averaged to determine an average cross sectional area.

The cross sectional area of a material at one z position in the sensor may also provide useful information. For example, the cross sectional area of a liquid in a gas/liquid flow may be calculated for the center of the sensor and such area may be calculated repeatedly over time. Each of the calculated areas may be compared to the others. If the cross sectional area of the liquid is fluctuating or oscillating over time, the frequency and amplitude of the oscillations in the cross sectional area would be a measure of the frequency and magnitude of waves in the flowing mixture within the sensor.

Test Results

The concept was tested using a vertical tube 160 with salt 162 and air 164 as two phase media in a vertical orientation as shown in FIG. 17. This test is using static materials in a sensor volume as opposed to flowing materials to simplify the test and to enable easy verification of the calculated information as compared to the actual information. The interface between the salt and the air can be visually or physically determined and compared to the interface that is calculated based on a tomogram. In this test, the actual position of the interface between salt and air was determined visually for four different levels of salt, and the visual measurements of the interface were very nearly the same as the interface calculated from a tomogram using the techniques described above. In this test, the interface 166 is horizontal and approximately flat, and the interface lies within the sensing volume of electrodes 168. The theoretical volume fraction of salt based on electrode length is $$\varepsilon_* = \frac{z - z_1}{L}.$$

Figure 18:
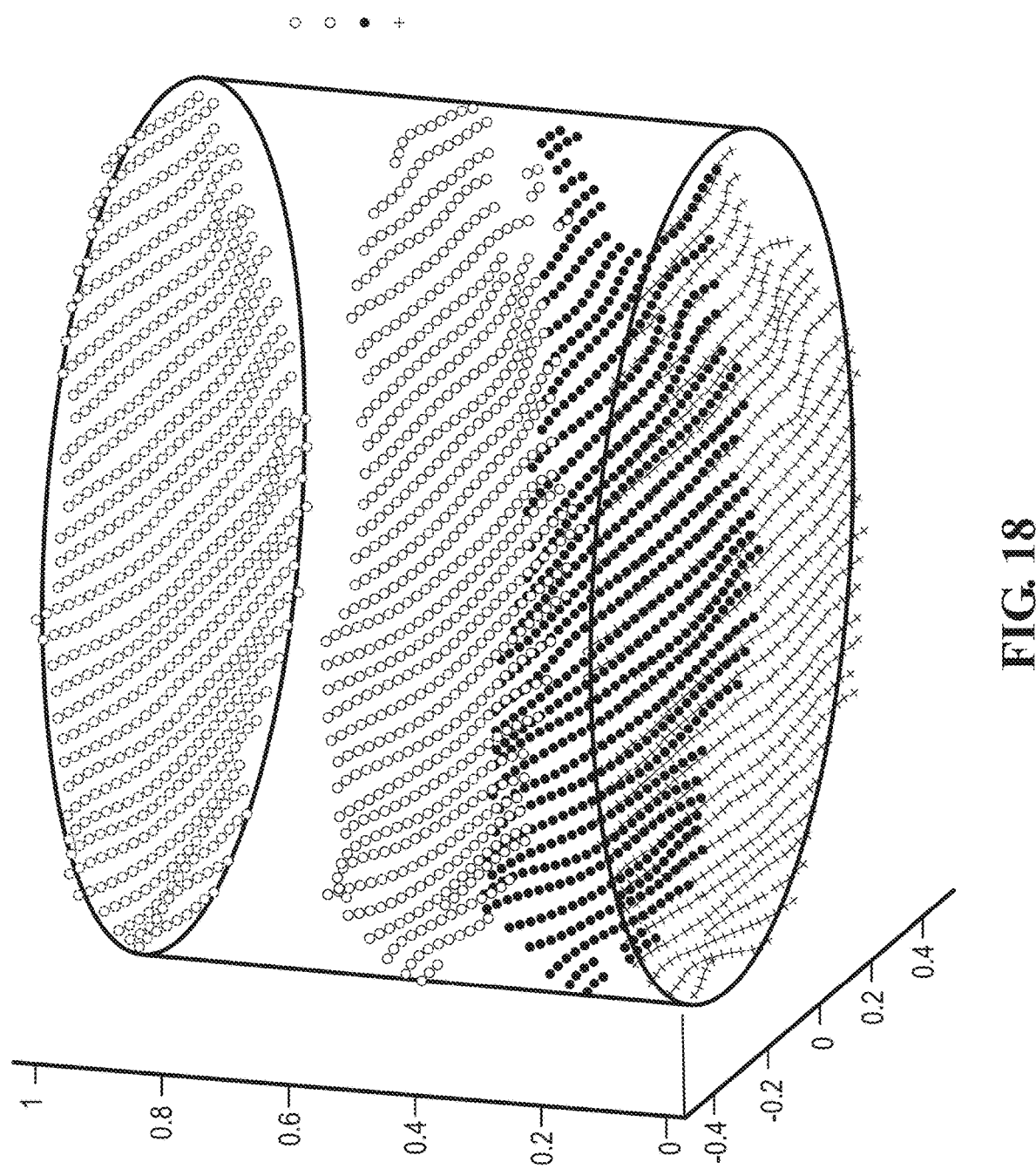
FIG. 18 is a three dimensional illustration of 4 different tomograms representing 4 different measurements of 4 different levels of salt within a sensor.
Figure 19:
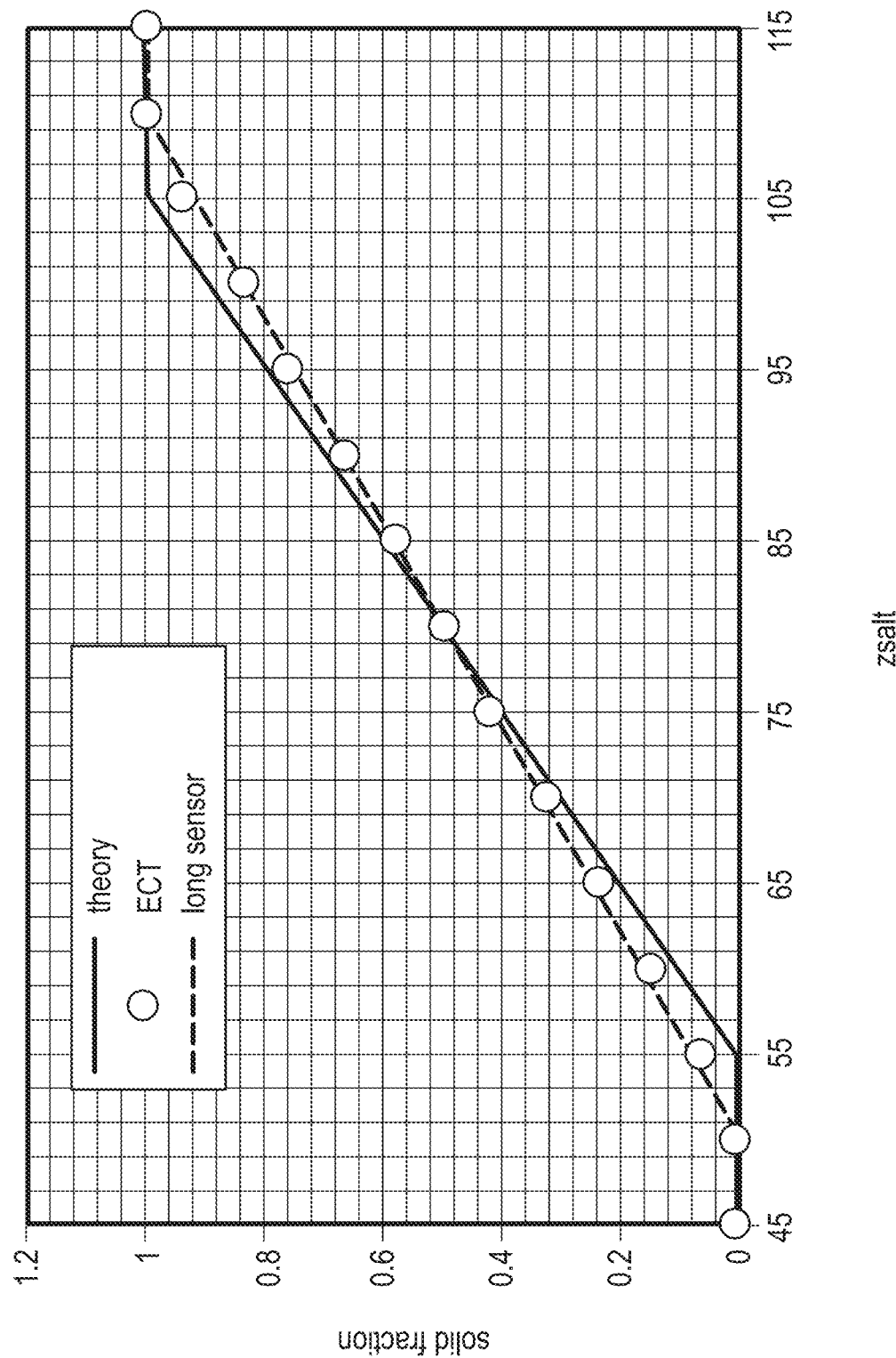
FIG. 19 is a graph showing the correspondence of the theoretical solid fractions and the measured solid fractions of salt in the sensor of FIG. 17.

FIG. 18 shows the tomograms for four different levels of salt within the sensing volume of electrodes 168. FIG. 19 shows how the sensor model based on the concept $z=L\varepsilon_*$ compares with the experimental results. As can be seen, the sensor is sensitive to the presence of material approximately 5 mm or 0.714 diameters outside the electrodes. This is not unexpected as the electric field extends past the ends of the electrodes. The effect can be captured by using an apparent length of 60 mm for the electrodes and provides support that the proposed methods will be accurate for liquid vapor interfaces as long as the features are longer than the length of the electrodes. Thus the technique should provide a useful metric for the interfacial areas: $A_{lg}$, $A_{lw}$, $A_{gw}$.

Exemplary Apparatus

Figure 20:
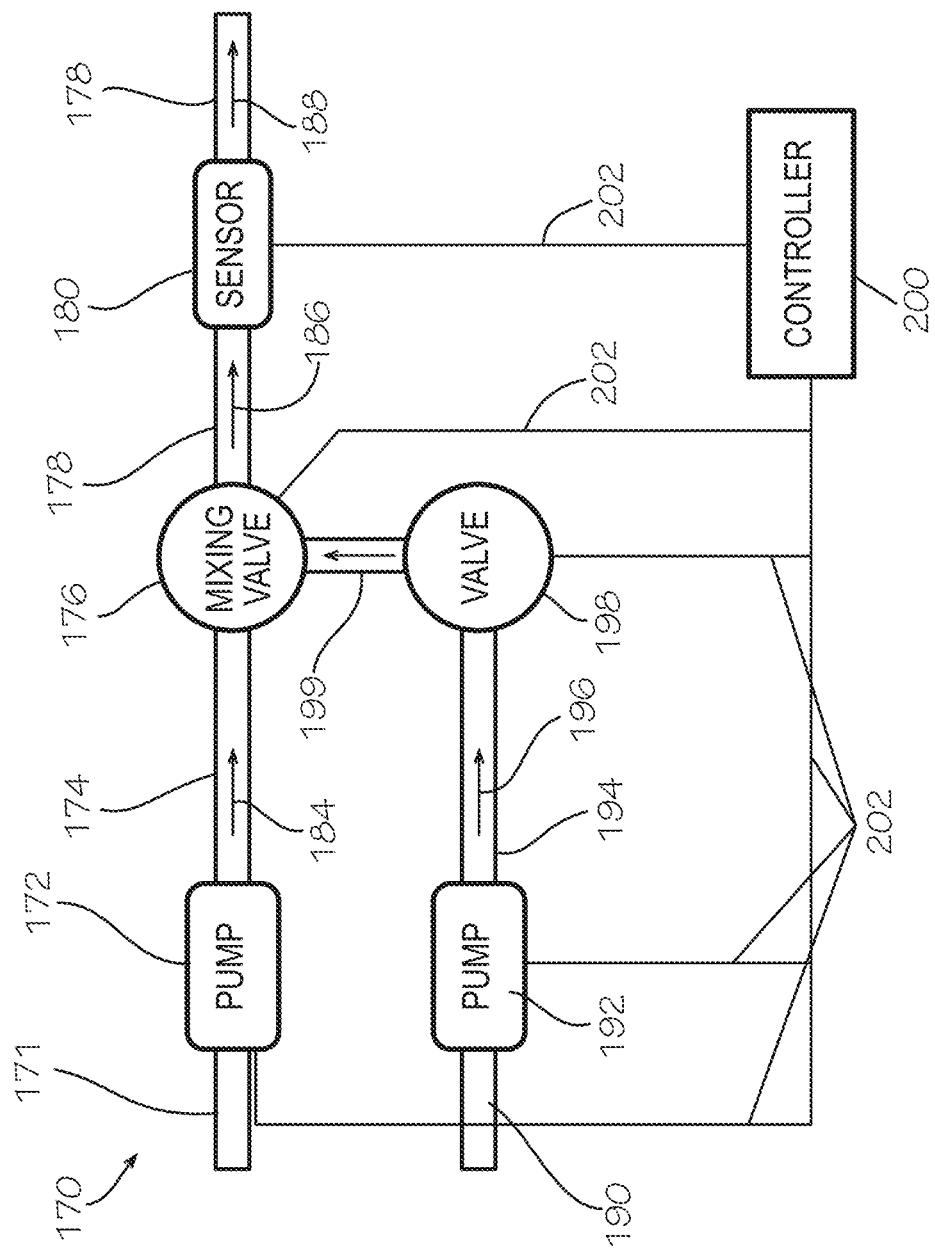
FIG. 20 illustrates an apparatus for implementing the methods discussed herein.

FIG. 20 illustrates an exemplary apparatus 170 for implementing the methods described above. A conduit 171 provides a supply of flowing multiple materials, such as water and steam, to a pump 172 which pressurizes the mixture. The output of pump 172 is supplied through a conduit 174 to an input of a mixing valve 176, with the flow of the mixture being indicated by arrow 184. The mixing valve 176 also receives an input of at least one flowing material from conduit 199, which for example may be water. The mixing valve 176 independently controls the flow from conduits 174 and 199 mixes the materials from conduits 174 and 199 and outputs the mixed materials through conduit 178 to the sensor 180. The flow into and out of the mixing valve 176 is indicated by the arrows 184, 199 and 186. The sensor 180 surrounds the conduit 178 and the flowing mixture continues uninterrupted through the sensor 180 and within the conduit 178 as indicated by flow arrow 188. The sensor 180 corresponds to the sensor 32 discussed above.

The sensor 180 provides an output to a controller 200 which includes data processors and communication devices for implementing the methods. The controller 200 powers the sensor 180 and receives communications from the sensor 180 through lines 202, which are communication lines and power lines. The controller 200 is also connected to power and control pump 192, valve 198, mixing valve 176 and pump 172 through the lines 202. The pump 192 is connected to a supply conduit 190 and, in this example, is supplied with water. The output of pump 192 flows through conduit 194 to valve 198 as indicated by the flow arrow 196, and the valve 198 controls the flow through conduit 199 to the mixing valve 176.

The sensor 180 measures capacitance and those capacitance measurements are provided to the controller 200 which calculates a tomogram as discussed above with respect to sensor 32. The controller 200 repetitively samples the sensor 180 and repetitively produces tomograms at a rate that is sufficient for a particular application, which will vary widely. In this application, the controller 200 is configured to produce tomograms at a rate of one sample per second. The controller 200 is also configured to calculate one or more of the hypothetical physical characteristics discussed above in less than one half a second. So, for example, the controller 200 may calculate a hypothetical surface area of the interface between the water and steam within the sensor 180. In addition, the sensor 180 may calculate additional hypothetical physical characteristics, such as the hypothetical area of a wall of the sensor 180 in contact with steam. Then, the controller 200 compares the hypothetical physical characteristics against predefined limits and transmits control commands when the hypothetical physical characteristics meet or exceed the predefined limits. So, for example if the hypothetical surface area between the wall of sensor 180 and steam exceeds its predefined limit, the controller 200 issues control commands to the pump 192 and the valve 198 causing a desired amount of flow through the conduit 199 and water is introduced through the mixing valve 176 into the conduit 178. The supply of water through the mixer 176 will decrease the amount of steam in the flowing mixture and will decrease the surface area of the sensor wall that is contacted by steam.

The controller 200 may also be calculating the hypothetical surface area between the water and gas within the sensor 180. Also, it may be saving each such calculation and calculating a rate of change in the hypothetical surface area between the water and gas. When this rate of change exceeds a predefined limit, that circumstance in this particular embodiment can be predicting the formation of oscillations within the flowing mixture in the conduit 178. In this particular embodiment, such waves would constitute a dangerous or catastrophic event. Thus, the controller 200 in response to such condition issues commands to stop the pump 172 and 192. In addition, it will command the valve 198 and the mixing valve 176 to stop all flow through the conduit 178, and the apparatus 170 is shut down. Alternatively, when the rate of change exceeds a predefined limit, the controller 200 may be programmed to take corrective action. For example, the pump 192, valve 198 and mixing valve 176 may receive commands to introduce more water into the flow within conduit 178. By increasing the water, hopefully, the rate of change in the surface area between the water and steam will reverse or stabilize. The controller 200 will continue to monitor such rate of change and will allow the embodiment to continue functioning so long as the rate of change remains below the predefined limit. It will be understood that all of the various hypothetical physical characteristics discussed herein may be calculated by the controller 200 and compared against one or more predefined limits, and in each case corrective actions may be executed when any of the hypothetical physical characteristics exceed their limits, and one of those corrective actions could be a complete shutdown of the apparatus 170.

Having described several embodiments and variations of the invention in the above Detailed Description, it will be understood that the invention is capable of numerous modifications, rearrangements and substitutions of parts without departing from the spirit of the invention as defined in the Claims.

REFERENCES

[1] Wallis, G., "One-Dimensional Two Phase Flow, 1969, McGraw-Hill Inc.
[2] Industrial Tomography Systems plc, Sunlight House, 85 Quay Street, Manchester, M3 3JZ, UK
[3] Kreitzer, P., Hanchak, M. and Byrd, L., "Horizontal Two Phase Flow Regime Identification: Comparison of Pressure Signature, ECT and High Speed Visualization", presented at 2012 ASME IMECE, Houston, Tex.
[4] Taylor, A. E., Mann, W. R., "Advanced Calculus", $2^{nd}$ ed., 1972, Xerox College Publishing
[5] Larson, R. E., Hostetler, R. P., Edwards, B. H., "Calculus with Analytical Geometry" $6^{th}$ ed., 1998, Houghton Mifflin Co.
[6] Carnahan, B., Luther, H. A., Wilkes, J. O., "Applied Numerical Methods", 1969, J. Wiley & Sons, Inc.

The invention claimed is:

1. A method of estimating a physical characteristic of a material, comprising:
    disposing a flowing mixture of a first material and a second material in a three-dimensional sensor volume;
    defining within the three-dimensional sensor volume a matrix of parallel voxels, each voxel having x, y and z dimensions;
    measuring at least one parameter of the mixture of the first and second material within the three-dimensional sensor volume and producing a tomogram in the form of a two-dimensional matrix that is defined within a perimeter and contains multiple values with one value being associated with each voxel, each value representing an amount of the first material in the associated voxel;
    calculating multiple hypothetical points having x, y and z coordinates in the three-dimensional sensor volume based on the multiple values of the tomogram, the z coordinate of each point being calculated from at least one value of the tomogram and the x and y coordinates of each point corresponding to at least the associated voxel of the at least one value of the tomogram;
    calculating at least one estimated physical characteristic of the first material based on the multiple points; and
    changing the flowing mixture of the first and second materials in response to at least one estimated physical characteristic of the first material to change a physical characteristic of the flowing mixture.

2. The method of claim 1 wherein calculating at least one estimated physical characteristic comprises calculating a surface area based on the multiple hypothetical points that is an estimate of the surface area of an interface between the first and second materials within the volume.

3. The method of claim 1 wherein the three-dimensional sensor volume is defined by a circumferential sensor wall and by length dimensions of a sensor and wherein calculating at least one estimated physical characteristic comprises calculating a hypothetical surface area of the interface between the circumferential wall and the first material based on the values in the tomogram along the perimeter of the tomogram.

4. The method of claim 1 wherein the three-dimensional sensor volume is defined by a circumferential sensor wall and dimensions of a sensor and wherein calculating at least one estimated physical characteristic comprises calculating a hypothetical surface area of an interface between the circumferential wall and the second material based on the multiple hypothetical points that are disposed adjacent to the circumferential wall.

5. The method of claim 1 wherein calculating at least one estimated physical characteristic comprises calculating a volumetric void fraction based on the multiple hypothetical points that is an estimate of a volume fraction of at least one of the materials within the three-dimensional sensor volume.

6. The method of claim 1 wherein calculating at least one estimated physical characteristic comprises providing mass densities of the first and second materials within the three-dimensional sensor volume and calculating an estimated centroid of mass of the mixture of the first and second material within the three-dimensional sensor volume based upon the multiple hypothetical points and the mass densities of the first and second materials.

7. The method of claim 1 wherein calculating at least one estimated physical characteristic comprises calculating an estimated cross sectional area of one of the materials within the three-dimensional sensor volume based upon the multiple hypothetical points.

8. The method of claim 1 wherein calculating multiple hypothetical points in the volume comprises:
    calculating the z coordinate of each point based on a value of the tomogram; and
    determining the x and y coordinates of each point based on the position of a voxel.

9. The method of claim 1 wherein calculating at least one estimated physical characteristic comprises:
    mapping a surface to the multiple points to produce a mapped surface; and
    calculating the at least one estimated physical characteristic of the first material based on the mapped surface.

10. The method of claim 9 wherein calculating the at least one estimated physical characteristic comprises calculating a surface area of the mapped surface to produce a calculated surface area that is an estimate of the surface area of an interface between the first and second materials within the volume.

11. The method of claim 9 wherein mapping comprises:
    defining a plurality of triangular planar surfaces using a plurality of combinations of three adjacent points within the multiple points whereby the mapped surface is the plurality of triangular planar surfaces;
    calculating the surface area of each triangular surface to produce multiple area values; and
    adding the multiple area values to produce the estimate of the surface area of the interface between the first and second materials within the volume.

12. The method of claim 9 wherein mapping comprises:
    defining a plurality of elements based upon the points, each element including four points;
    defining a three-dimensionally curved surface within each element;
    calculating the surface area of each three-dimensionally curved surface to produce multiple area values; and
    adding the multiple area values to produce the estimate of the surface area of the interface between the first and second materials within the volume.

13. The method of claim 9 wherein calculating the at least one estimated physical characteristic comprises calculating an estimated volume of the first material based on the mapped surface.

14. A method of estimating a physical characteristic of a material, comprising:
    providing a flowing mixture of a first phase of the material and a second phase of the material in a conduit wherein the flowing mixture is controlled by at least one pump and at least one valve;
    disposing the flowing mixture moving in a flow direction within a three-dimensional sensor volume defined by a circumferential sensor wall and length dimensions of a sensor;
    disposing a plurality of capacitive sensors in a side-by-side relationship around and adjacent to the circumferential sensor wall, each sensor having a width and a length, and the length of each sensor being parallel to the flow direction of the flowing mixture;
    defining within the three-dimensional sensor volume a matrix of parallel voxels, each voxel having x, y and z dimensions with the z dimension being parallel to the flow direction;
    measuring capacitance within the three-dimensional sensor volume using the plurality of capacitive sensors and producing a tomogram in the form of a two-dimensional matrix containing multiple values with one value being associated with each voxel and corresponding to the electrical permittivity of the material within the voxel that is associated with the value, each value also corresponding to an amount of the first phase of the material in the associated voxel;

calculating multiple hypothetical points having x, y and z coordinates in the three-dimensional sensor volume based on the multiple values of the tomogram, the z coordinate of each point being calculated from at least one value of the tomogram and the x and y coordinates of each point corresponding to at least the associated voxel of the at least one value;

calculating at least one estimated physical characteristic of the material based on the multiple points and based on the assumption that the multiple points lie on a hypothetical interface between the first and second phases within the three-dimensional sensor volume; and controlling at least one of the pump or the valve to modify the flowing mixture based upon the estimated physical characteristic.

15. The method of claim 14 wherein the estimated physical characteristic is at least one of the following: a surface area of the interface between the first and second phases, a surface area of the sensor wall in contact with the first phase, a surface area of the sensor wall in contact with the second phase, a mass centroid of the material within the three-dimensional sensor volume, the fraction of the three-dimensional sensor volume occupied by the first phase, and the cross sectional area of the first phase within the three-dimensional sensor volume.

16. The method of claim 14 wherein a surface area of the sensor wall in contact with the first phase is estimated using only the outermost values in the tomogram.

17. The method of claim 14 wherein a surface area of the sensor wall in contact with the first phase is estimated using only the outermost points of the multiple points.

* * * * *